US007751001B2

(12) United States Patent
Ge et al.

(10) Patent No.: US 7,751,001 B2
(45) Date of Patent: Jul. 6, 2010

(54) TRANSFLECTIVE LCD WITH REFLECTIVE LAYER CONNECTED TO REFERENCE VOLTAGE GREATER THAN 0.5 VRMS AND LESS THAN LC THRESHOLD VOLTAGE

(75) Inventors: Zhibing Ge, Orlando, FL (US); Xinyu Zhu, Orlando, FL (US); Ruibo Lu, Orlando, FL (US); Thomas Xinzhang Wu, Orlando, FL (US); Shin-Tson Wu, Orlando, FL (US); Wang-Yang Li, Tainan County (TW); Chung-Kuang Wei, Taipei (TW)

(73) Assignees: Chimel Innolux Corporation, Maio-Li County (TW); University of Central Florida Research Foundation, Inc., Orlando, FL (US)

( * ) Notice: Subject to any disclaimer, the term of this patent is extended or adjusted under 35 U.S.C. 154(b) by 276 days.

(21) Appl. No.: 11/689,012

(22) Filed: Mar. 21, 2007

(65) Prior Publication Data
US 2008/0231781 A1    Sep. 25, 2008

(51) Int. Cl.
*G02F 1/1335* (2006.01)
*G02F 1/1343* (2006.01)
*G02F 1/1333* (2006.01)

(52) U.S. Cl. .................... 349/114; 349/141; 349/38; 349/39; 349/85

(58) Field of Classification Search ............... 349/39, 349/59, 75, 34, 47, 114
See application file for complete search history.

(56) References Cited

U.S. PATENT DOCUMENTS

| 4,579,424 | A * | 4/1986 | Matsukawa et al. ......... 349/108 |
| 6,128,064 | A * | 10/2000 | Moriyama et al. .......... 349/173 |
| 6,650,385 | B1 * | 11/2003 | Liu ............................ 349/113 |
| 6,784,955 | B2 * | 8/2004 | Kwok et al. .................. 349/99 |
| 7,015,997 | B2 | 3/2006 | Choi et al. ................... 349/114 |
| 2003/0202139 | A1 * | 10/2003 | Choi et al. ................... 349/113 |
| 2004/0114059 | A1 * | 6/2004 | Lee et al. ....................... 349/39 |
| 2005/0007522 | A1 * | 1/2005 | Hiraga et al. ................ 349/106 |
| 2005/0024548 | A1 * | 2/2005 | Choi et al. ..................... 349/43 |
| 2005/0078242 | A1 * | 4/2005 | Park et al. ................... 349/113 |
| 2005/0105015 | A1 * | 5/2005 | Chen et al. .................... 349/84 |
| 2005/0105033 | A1 * | 5/2005 | Itou et al. .................... 349/141 |

(Continued)

OTHER PUBLICATIONS

D Pauluth, K Tarum, "Advanced Liquid Crystals for Television", Mar. 19, 2004, Journal of Materials Chemistry, vol. 14, pp. 1219-1227.*
Pancharatnam et al., "Achromatic Combinations of Birefringent Plates: Part 1. An Achromatic Circular Polarizer", Proceedings of the Indian Academy of Sciences, vol. 41, sec. A, pp. 130-136, 1995.

(Continued)

*Primary Examiner*—Andrew Schechter
*Assistant Examiner*—Michael Inadomi
(74) *Attorney, Agent, or Firm*—Fish & Richardson P.C.

(57) ABSTRACT

A transflective display includes pixels each including a first electrode, a second electrode, a liquid crystal layer associated with the first and second electrodes, and a conductive reflective layer between the liquid crystal layer and the second electrode to reflect ambient light. The conductive reflective layer is insulated from the second electrode and covers less than all of the second electrode to allow backlight to be transmitted through a portion of the pixel not covered by the conductive reflective layer.

21 Claims, 22 Drawing Sheets

U.S. PATENT DOCUMENTS

2005/0140890 A1* 6/2005 Kim et al. .................. 349/139
2006/0001815 A1* 1/2006 Kim et al. .................. 349/141
2006/0061700 A1* 3/2006 Chung et al. ................ 349/38
2007/0019136 A1* 1/2007 Hu et al. .................... 349/114

OTHER PUBLICATIONS

Zhu et al., "Analytical Solutions for Uniaxial-Film-Compensated Wide-View Liquid Crystal Displays", Journal of Display Technology, vol. 2, No. 1, pp. 2-20, Mar. 2006.

* cited by examiner

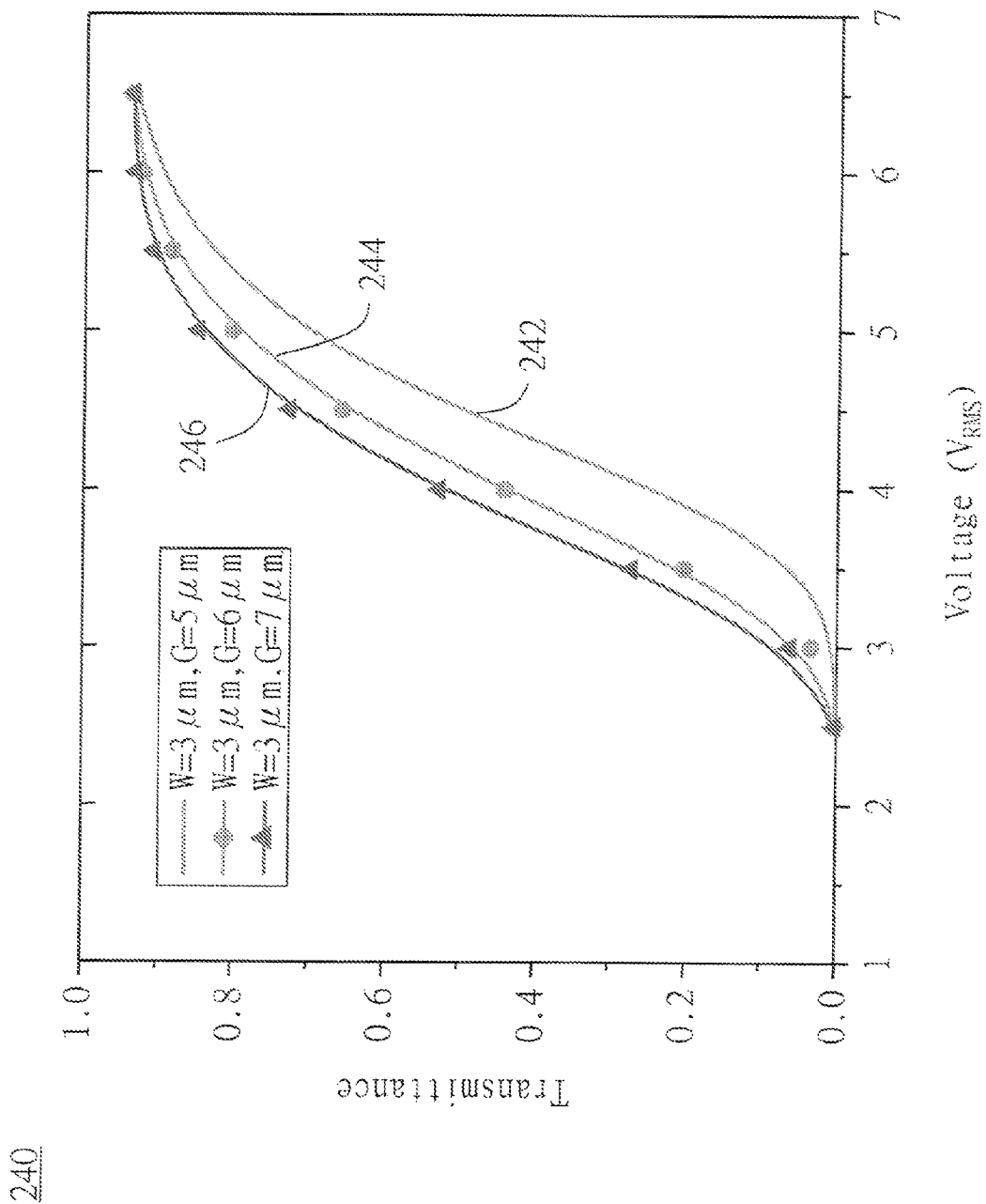

TRANSFLECTIVE LCD WITH REFLECTIVE LAYER CONNECTED TO REFERENCE VOLTAGE GREATER THAN 0.5 VRMS AND LESS THAN LC THRESHOLD VOLTAGE

BACKGROUND OF THE INVENTION

PARTIES TO A JOINT RESEARCH AGREEMENT

The subject matter disclosed in this patent application was developed under a joint research agreement between Chi Mei Optoelectronics and the University of Central Florida.

This description relates to transflective liquid crystal displays.

A transflective type liquid crystal display (LCD) can operate in a transmissive mode and/or a reflective mode. In some examples, each pixel of the transflective LCD is divided into a transmissive part (T sub-pixel) and a reflective part (R sub-pixel). When operating in the transmissive mode, a backlight module generates light that is modulated by the T sub-pixels. When operating in the reflective mode, reflected ambient light is modulated by the R sub-pixels. In some examples, the T sub-pixel and the R sub-pixel share a common liquid crystal layer with a uniform cell gap. In some examples, the R sub-pixel has a cell gap that is about one half of the cell gap of the T sub-pixel.

SUMMARY

In one general aspect, a transflective liquid crystal display achieves a good gray scale gamma curve match between transmissive and reflective modes by using, for each pixel, a reflective layer to shield a portion of the electric field between a pixel electrode and a common electrode. The reflective layer of different pixels can be connected to a common reference voltage. The electric field in the reflective portion of the liquid crystal cell is weaker than the electric field in the transmissive portion of the liquid crystal cell, so the phase retardation experienced by ambient or external light that travels the liquid crystal layer round trip is similar to the phase retardation of backlight that travels the liquid crystal layer once.

In another general aspect, an apparatus includes a transflective display having pixels, each pixel including a first electrode, a second electrode, a liquid crystal layer associated with the first and second electrodes, and a conductive reflective layer between the liquid crystal layer and the second electrode to reflect ambient light. The conductive reflective layer is insulated from the second electrode and covers less than all of the second electrode to allow backlight to be transmitted through a portion of the pixel not covered by the conductive reflective layer.

Implementations of the apparatus may include one or more of the following features. The conductive reflective layer shields a portion of the electric field between the first and second electrodes. The conductive reflective layers of at least two of the pixels are electrically connected. The conductive reflective layers of at least two of the pixels are electrically connected to a common reference voltage. The conductive reflective layer reduces an effective birefringence change in a portion of the liquid crystal layer corresponding to the conductive reflective layer when an electric field is applied across the liquid crystal layer. The display includes a passivation layer between the conductive reflective layer and the second electrode.

The first electrode is connected to a first reference voltage. In some examples, the conductive reflective layer is connected to a second reference voltage that is different from the first reference voltage. In some examples, the conductive reflective layer is also connected to the first reference voltage. The first reference voltage can be, e.g., a ground reference voltage. In some examples, the conductive reflective layer is connected to a reference voltage having a root-mean-square value greater than 0.5V and less than a threshold voltage of the liquid crystal layer.

The conductive reflective layer increases a degree of similarity between a voltage-transmittance characteristic and a voltage-reflectance characteristic of the pixel. A reflectance of the pixel is equal to a transmittance of the pixel for a pixel voltage between a first voltage corresponding to a minimum gray level and a second voltage corresponding to a maximum gray level. The conductive reflective layer includes at least one conductive reflective strip. The conductive reflective layer in at least one of the pixels includes two or more conductive reflective strips. The display includes a first alignment layer having a first alignment direction and a second alignment layer having a second alignment direction, the first and second alignment directions being non-perpendicular to a lengthwise direction of the conductive reflective strips. Each of the conductive reflective strips has a width between 1 μm and 10 μm. Two adjacent reflective strips are parallel to each other, and the distance between the two conductive reflective strips is between 2 μm and 15 μm. The conductive reflective layer in each of the pixels includes five or more conductive reflective strips. Each of the conductive reflective strips includes at least one of straight, curved, and piecewise linear shapes. The liquid crystal layer has a substantially uniform thickness across the pixel.

The liquid crystal layer includes molecules that are substantially aligned along a direction normal to a surface of the first electrode when the voltage applied across the liquid crystal layer is below a threshold. The liquid crystal layer includes a negative dielectric anisotropic liquid crystal material. Each pixel includes a storage capacitor for storing an electric charge corresponding to a pixel voltage, and a transistor coupled to the storage capacitor and the second electrode. The conductive reflective layer includes at least one of aluminum and silver. The display includes a polarizer, e.g., a circular polarizer.

In another aspect, in general, an apparatus includes a plurality of pixels, each pixel including a liquid crystal layer between a first electrode and a second electrode, and a reflective shielding member. The first and second electrodes generate an electric field in the liquid crystal layer. The reflective shielding member reflects external light and shields an electric field at a region corresponding to the reflective shielding member to cause the electric field to be weaker than at surrounding regions at which backlight is transmitted through the pixel.

Implementations of the apparatus may include one or more of the following features. The reflective shielding member reduces an effective birefringence change in a portion of the liquid crystal layer corresponding to the reflective shielding member when the electric field is applied across the liquid crystal layer.

In another aspect, in general, an apparatus includes pixels each having a transmissive portion and a reflective portion. Each pixel includes a first electrode, a second electrode, a liquid crystal cell associated with the first and second electrodes, and a reflective layer corresponding to the reflective portion to reflect ambient light and provide electric shielding to reduce an electric field in the reflective portion as compared to an electric field in the transmissive portion.

Implementations of the apparatus may include one or more of the following features. The first electrode is to be coupled to a reference voltage, the second electrode is to be coupled to a pixel voltage, and the reflective layer is between the liquid crystal layer and the second electrode. The reflective layer is configured to increase a similarity level between voltage-transmission characteristics and voltage-reflectance characteristics of the pixel, as compared to a pixel having a reflective layer that is electrically coupled to the second electrode. The pixels are in dark states when no electric field is applied to the liquid crystal layer.

In another aspect, in general, a method includes generating an electric field in a liquid crystal layer of a display, reflecting external light using a conductive reflective layer between the liquid crystal layer and an electrode, shielding the electric field to cause a first region in the liquid crystal layer corresponding to the reflective layer to have a weaker electric field than does to a second region in the liquid crystal layer adjacent to the first region, and transmitting backlight through the second region.

Implementations of the method may include one or more of the following features. Shielding the electric field includes using the conductive reflective layer to shield the electric field. The method includes connecting the reflective layer in at least two of the pixels of the display to a common reference voltage. The method includes using the reflective layer to increase a similarity level between voltage-reflectance characteristics and voltage-transmittance characteristics of the pixel. Shielding the electric field includes using a reflective layer that has two or more reflective strips to form two or more regions in the pixel, each region having a weaker electric field than adjacent regions. The method includes forming five or more regions above the reflecting layer within the pixel, each region having a weaker electric field than surrounding regions.

The method includes reducing an effective birefringence change in the first region of the liquid crystal layer as compared to the effective birefringence change in the second region of the liquid crystal layer. The method includes tilting liquid crystal molecules in the first region of the liquid crystal layer by an amount that is less than the amount of tilt of the liquid crystal molecules in the second region of the liquid crystal display. The method includes connecting the first electrode to a first reference voltage. In some examples, the method includes connecting the reflective layer to a second reference voltage that is different from the first reference voltage. In some examples, the method includes connecting the reflective layer to the first reference voltage. In some examples, the method includes connecting the reflective layer to a reference voltage having a root-mean-square value greater than 0.5V and less than a threshold voltage of the liquid crystal layer. The method includes showing a dark state at the pixel when the pixel voltage is below a threshold.

In another aspect, in general, a method of fabricating a transflective display includes forming a pixel electrode pixel on a first substrate, forming a passivation layer on the pixel electrode, forming a conductive reflective layer on the passivation layer, the reflective layer covering less than all of the pixel electrode, forming a common electrode on a second substrate, and providing a liquid crystal layer between the first and second substrates.

Implementations of the apparatus may include one or more of the following features. The method includes forming conductive lines to electrically connect the reflective layers of at least two of the pixels of the display. The method includes providing alignment layers on the first and second substrates to cause the liquid crystal molecules of the liquid crystal layer to substantially align along a direction normal to the surfaces of the substrates when no voltage is applied to the first and second electrodes. The method includes forming a transistor on the first substrate and connecting the transistor to the first electrode.

Advantages of the transflective displays can include one or more of the following. The transflective liquid crystal display can be used in different ambient conditions, has a high light efficiency, and can use a single gray-scale gamma curve to drive the display in both the transmissive mode and the reflective mode. The liquid crystal cell has a single cell gap and is easy to fabricate.

DETAILED DESCRIPTION

Figure 1:
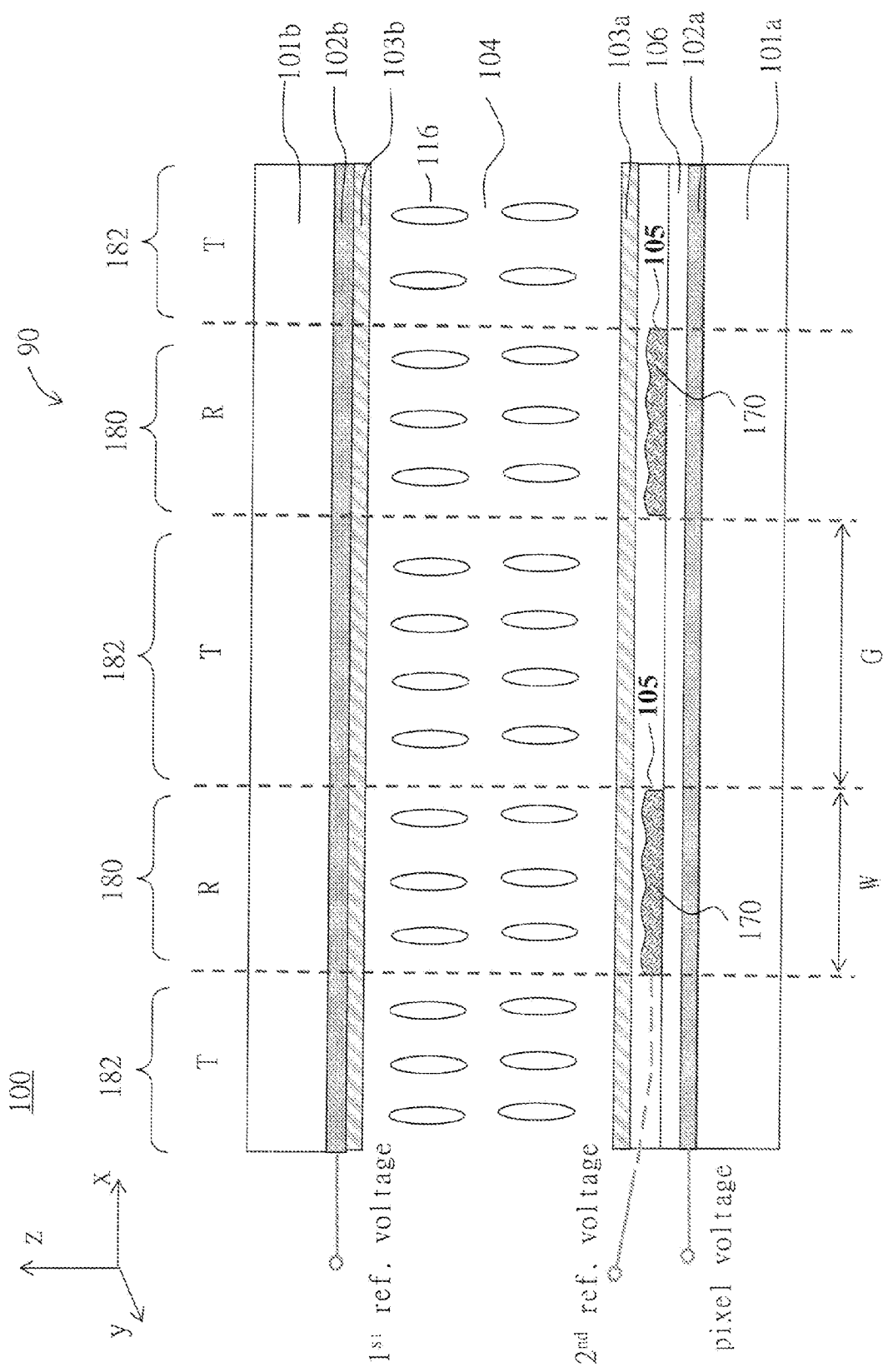
FIG. 1 is a cross-sectional diagram of a pixel.

FIG. 1 is a cross-sectional diagram of an example of a pixel 90 of a transflective liquid crystal display 100 that includes a vertically aligned liquid crystal layer 104 positioned between a lower glass substrate 101a and an upper glass substrate 101b. The liquid crystal layer 104 includes, e.g., a negative dielectric anisotropy liquid crystal material. On the upper glass substrate 101b are a transparent common electrode 102b and an upper alignment layer 103b. On the lower glass substrate 101a are a transparent pixel electrode 102a, a passivation layer 106, a patterned conductive reflective layer 105 having strips 170, and a lower alignment layer 103a. The conductive reflective layer 105 affects the distribution of the electric field in the liquid crystal layer 104 such that the electric field above a reflective portion of the pixel 90 is weaker than the electric field in a transmissive portion of the pixel 90.

The electrodes 102a and 102b can be made of, e.g., indium-tin-oxide (ITO). The conductive reflective layer 105 can be made of, e.g., a metal material. The passivation layer 106 can be made of, e.g., silicon oxide ($SiO_2$) or silicon nitride ($Si_3N_4$). The alignment layers 103a and 103b cause the liquid crystal molecules 116 in the liquid crystal layer 104 to be initially aligned along a vertical direction (i.e., a direction normal to the surfaces of the substrates 101a and 101b). A pair of crossed polarizers (not shown) are provided on the outer sides of the substrates 101a, 101b.

In this description, the outer side refers to the side away from the liquid crystal layer 104, and the inner side refers to the side facing the liquid crystal layer 104. The terms "top," "bottom," "upper," "lower," "above," and "below" are used to describe relative positions of components of the display in the figures. The display can have different orientations so that in some circumstances a lower layer may be above an upper layer.

In some examples, the common electrode 102b is connected to a first reference voltage, such as a ground voltage. The pixel electrode 102a is connected to a pixel voltage $V_{DATA}$ (which can be provided by a data line or a storage capacitor) that corresponds to a gray scale level.

A Cartesian coordinate system having x, y, and z axes is used as a reference for describing the orientations of the components of the display 100. In this example, the z-axis is selected to be perpendicular to the surfaces of the substrates 101a and 101b. The x-axis and the y-axis are parallel to the surfaces of the substrates 101a and 101b.

When no voltage (or 0 V) is applied to the pixel electrode 102a, the liquid crystal molecules 116 are aligned substantially parallel to the z-axis, and the pixel 90 appears dark under crossed polarizers. When a pixel voltage is applied between the pixel electrode 102a and the common electrode 102b, an electric field is generated across the liquid crystal layer 104, causing liquid crystal molecules in the liquid crystal layer 104 to tilt relative to their initial positions. By varying the pixel voltage level, the tilt angle of the liquid crystal molecules can be varied, thereby generating different amounts of birefringence so that the pixel 90 can show different gray scale levels.

The portions of the pixel 90 corresponding to the reflective layer 105 will collectively be referred to as the reflective portion 180 of the pixel 90, and the portions of the pixel 90 corresponding to the pixel electrode 102 not covered by the reflective layer 105 will collectively be referred to as the transmissive portion 182 of the pixel 90. The reflective portion 180 reflects ambient or external light to allow a user to view images on the display 100 in outdoors or other bright light conditions. The transmissive portion 182 allows the user to view images using backlight when the ambient light is low.

The conductive reflective layer 105 is connected to a second reference voltage, which can be the same as the first reference voltage (or ground voltage). The second reference voltage can also be slightly lower than a threshold voltage of the liquid crystal layer. The threshold voltage is a voltage below which the perturbation of liquid crystal molecule orientations is negligible with respect to the initial state when no pixel voltage is applied. In some examples, the common electrodes 102b of all the pixels 90 in the display 100 are electrically connected to the same reference voltage, and the reflective layer 105 of all the pixels 90 are electrically connected to the same reference voltage.

The conductive reflective layer 105 changes the distribution of the electric field in the liquid crystal layer 104 such that the electric field in the reflective portion 180 is weaker than the electric field in the transmissive portion 182. The liquid crystal molecules in the reflective portion 180 are tilted less than those in the transmissive portion 182. The phase retardation experienced by the ambient or external light that travels the liquid crystal layer 104 round trip in the reflective portion 180 is similar to the phase retardation of backlight that travels the liquid crystal layer 104 once in the transmissive portion 182. This allows the pixel 90 to show similar gray scale levels in the reflective portion 180 and the transmissive portion 182 for a given pixel voltage.

Figure 2:
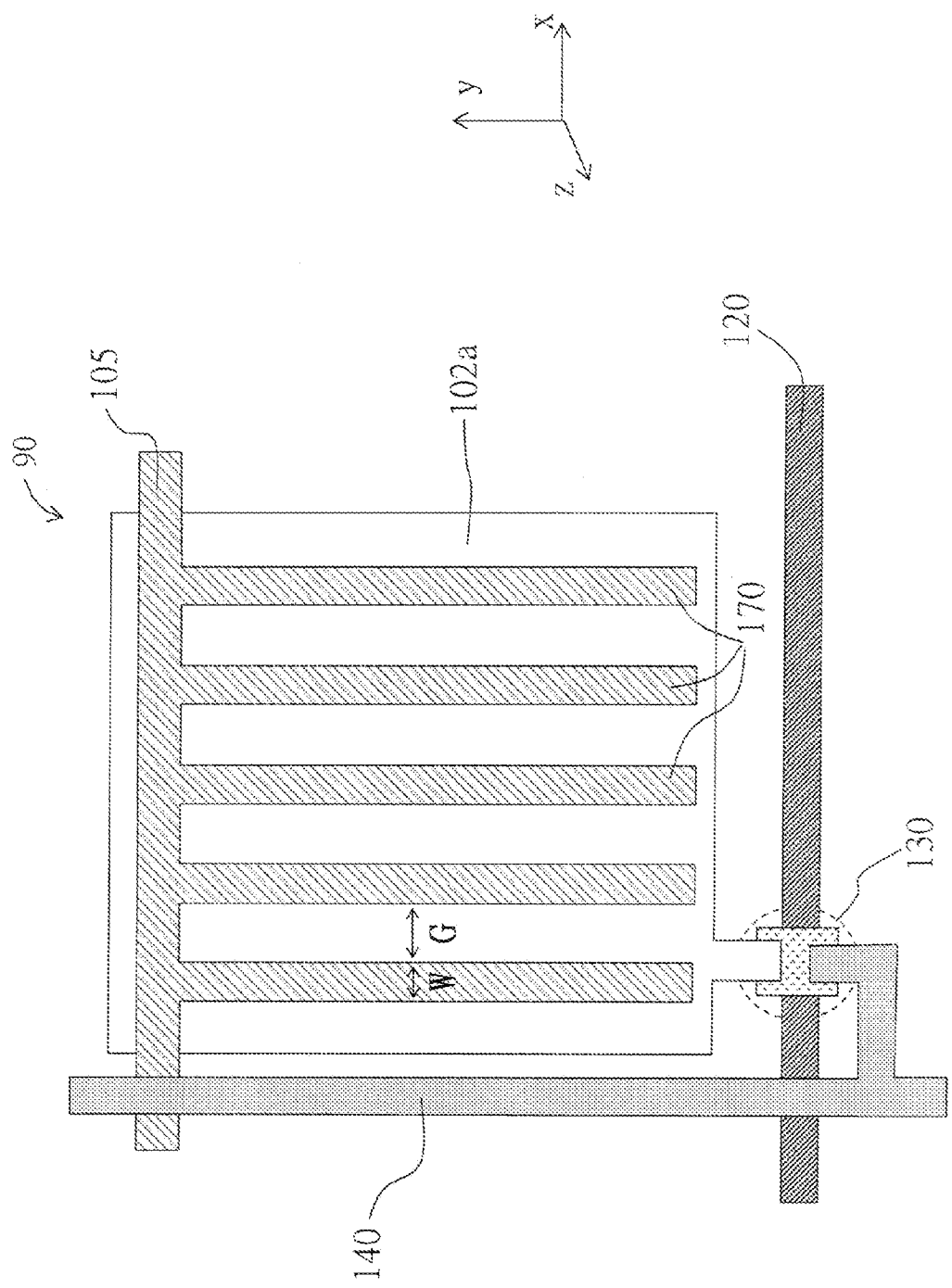
FIG. 2 is a top view of a pixel.

FIG. 2 is a top view of the pixel 90. The conductive reflective layer 105 is etched to form a pattern so that the reflective layer 105 covers or extends over only a portion of the pixel. In this example, the reflective layer 105 includes several straight reflective strips 170 that are parallel to the data line 140. Each of the reflective strips has a width W, and the gap between the strips is G. The width W can be, e.g., in a range between 1 μm to 10 μm, and the gap G between adjacent reflective strips can be, e.g., between 2 μm to 15 μm. Other patterns are possible. Strips need not be parallel or straight.

The pixel 90 includes a thin film transistor (TFT) 130 that functions as a switch between a data line 140 and the pixel electrode 102a. The thin film transistor 130 is controlled by a scan signal on a scan line 120. When the thin film transistor 130 is turned on, a pixel voltage $V_{DATA}$ on the data line 140 drives the pixel electrode 102a to the pixel voltage $V_{DATA}$.

The strength and direction of the electric field in the liquid crystal layer 104 is a function of position in the liquid crystal layer 104. A Cartesian coordinate system having x, y, and z axes is used to describe the orientations of the components of the display 100. In this example, the z-axis is selected to be perpendicular to the surfaces of the substrates 101a and 101b. The x-axis and the y-axis are parallel to the surfaces of the substrates 101a and 101b.

Figure 3A:
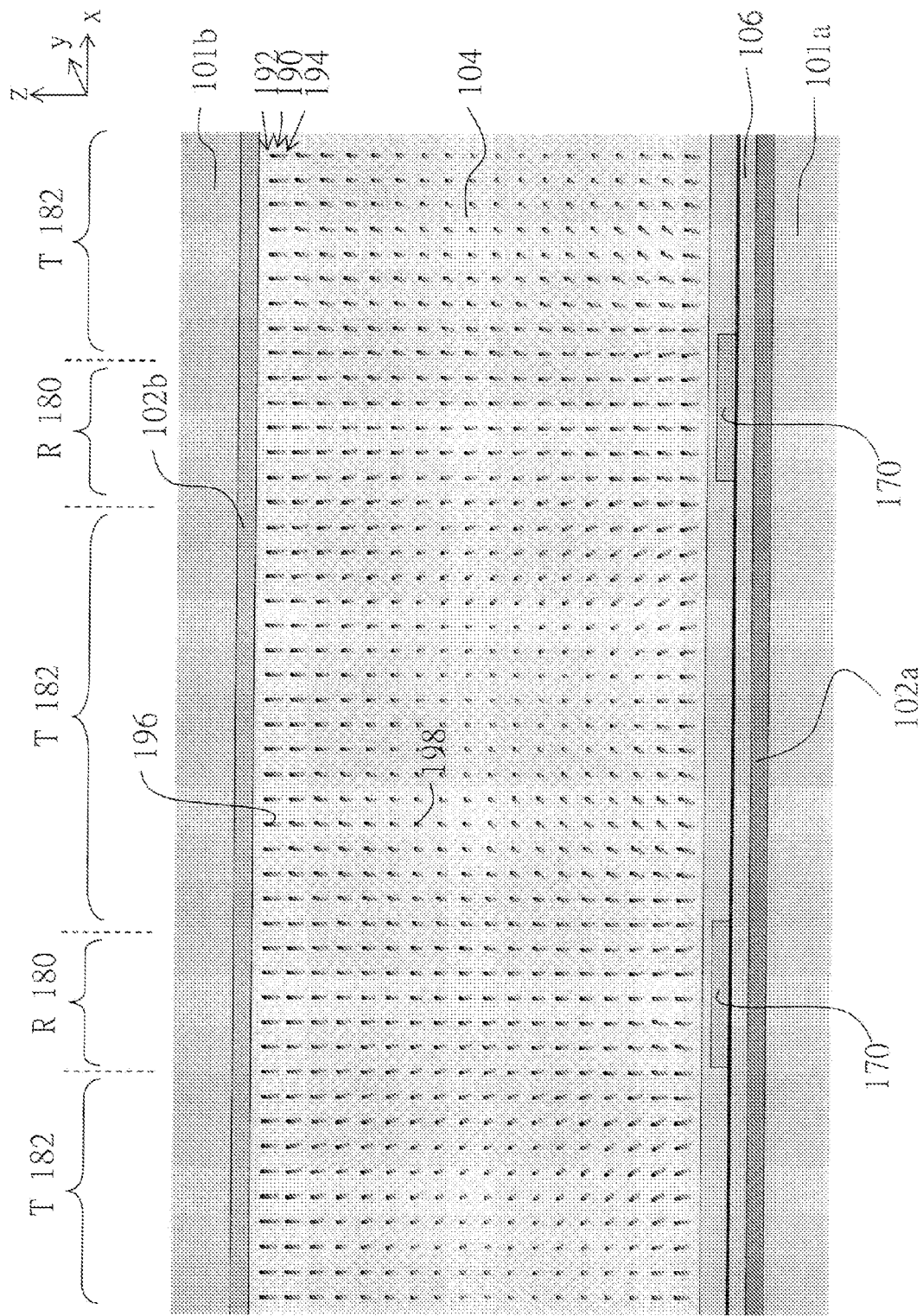
FIG. 3A is a graph showing simulated orientations of liquid crystal molecules.

FIG. 3A is a graph showing an example of simulated orientations of liquid crystal molecules in the liquid crystal layer 104 of a portion of a pixel 90 when the pixel 90 is operating in a bright state. In this example, the reflective layer 105 has a pattern shown in FIG. 2. FIG. 3A shows a cross section of the pixel 90 along a direction parallel to the X-Z plane. The average orientations of liquid crystal molecules in small, localized regions are represented by unit vectors called liquid crystal directors 190. Each liquid crystal director 190 is represented by a head 192 and a tail 194. A director (e.g., 196) more parallel to the X-Z plane is shown to be longer than a director (e.g., 198) that is more perpendicular to the X-Z plane.

In this example, the reflective layer 105 is set to 0 V with respect to the common electrode 102b, and the pixel voltage is 6 $V_{RMS}$ with respect to the common electrode 102b. $V_{RMS}$ represents root-mean-square voltage. The width W of the reflective strip 170 is 2 μm and the distance G between neighboring reflective strips is 5 μm. The liquid crystal material is a negative dielectric anisotropy material MLC-6608, available from Merck, Germany and having a parallel dielectric constant $\in_{\parallel}$=3.6, a perpendicular dielectric constant $\in_{\perp}$=7.8, elastic constants $K_{11}$=16.7 pN, $K_{33}$=18.1 pN, an extraordinary refractive index $n_e$=1.5578, and an ordinary refractive index $n_o$=1.4748 at wavelength λ=58.9 nm. The liquid crystal layer 104 has a cell gap of 5 μm. The azimuthal rubbing angles of the alignment layers 103a and 103b are both parallel to the reflective strips 170, and the rubbing direction of the alignment layer 103a is opposite to that of the alignment layer 103b.

The driving voltage ($V_{DATA}$) on the pixel electrode 102a drives the liquid crystal molecules to modulate the ambient light or backlight to show a corresponding gray scale level. When no voltage (or 0 V) is applied to the pixel electrode 102a, the liquid crystal molecules 116 are aligned parallel to the z-axis, and the pixel 90 appears dark under crossed polarizers. When a pixel voltage far above the threshold voltage is applied, the directors 190 in the transmissive portion 182 tilt down along the rubbing direction due to a strong vertical electric field.

The liquid crystal molecules 116 in the reflective region 180 tilt less than those in the transmissive region 182 in part because the electric field in some of the reflective region 180 is weaker than the electric field in the transmissive region 182. This can be seen from the equi-potential line plot described below.

Figure 3B:
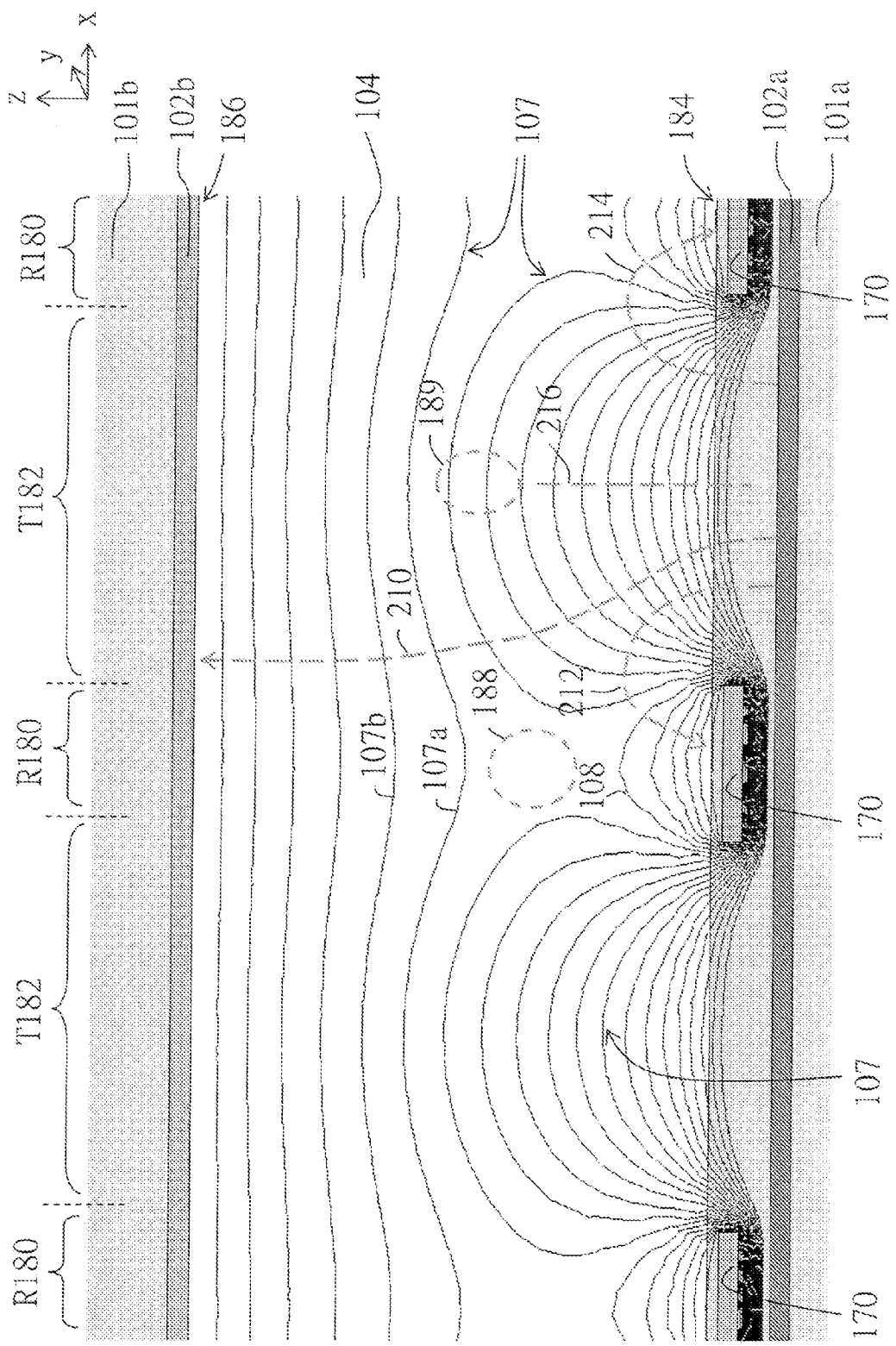
FIG. 3B is a graph showing simulated equipotential lines.

FIG. 3B is a graph showing simulated equipotential lines in the liquid crystal layer 104. The difference between two adjacent potential lines, e.g., 107a and 107b, is 0.25 $V_{RMS}$. In both the transmissive region 182 and the reflective region 180, the electric field is stronger near the bottom surface 184 of the liquid crystal layer 104 (the equipotential lines are denser) than the electric field near the top surface 186 of the liquid crystal layer 104. The direction of the electric field at any location is along the gradient of the equipotential lines at the location. The direction of the electric field can be represented by electric field lines, such as dashed lines 210, 212, and 214. For example, the electric field line 210 extends from the pixel electrode 102a to the common electrode 102b. The electric field lines 212 and 214 extend from the pixel electrode 102a to the reflective electrode 105.

Because in this example there is no electric potential difference between the strips 170 of the reflective layer 105 and the common electrode 102b, the reflective portion 180 has a region 188 with weak or no vertical electric potential difference. The potential line 107a above the region 188 and a potential line 108 below the region 188 represent the same electric potential.

In the reflective region 180, the vertical electric field near the reflective layer 105 causes the liquid crystal molecules near the surface of the liquid crystal layer 104 to tilt first. Those molecules in turn cause adjacent liquid crystal molecules above to tilt, eventually tilting the liquid crystal molecules in the bulk region of the reflective portion 180, including the liquid crystal molecules in the region 188 where there is weak or no electric field. This phenomenon will be referred to as a "surface field effect". The tilting of the liquid crystal molecules in the region 188 due to the surface field effect is less than the tilting of liquid crystal molecules in a corresponding region (e.g., 189) in the T portion 182, in which the liquid crystal molecules are tilted by the electric field.

In the example of FIGS. 3A and 3B, the alignment layers 103a and 103b are oriented such that the rubbing directions of the alignment layers 103a, 103b are parallel to the lengthwise direction (parallel to the y-axis) of the reflective strips 170 (FIG. 2). The liquid crystal molecules tilt toward a direction parallel to the rubbing direction, which is parallel to the y-axis. As discussed below, orienting the alignment layers 103a and 103b so that the rubbing direction is parallel to the lengthwise direction of the reflective strips 170 results in a higher light efficiency than having the rubbing direction perpendicular to the lengthwise direction of the reflective strips 170.

The electric field in the liquid crystal layer 104 has a component that is parallel to the x-axis. If the rubbing directions of the alignment layers are parallel to the x-axis (e.g., lower alignment layer in the +x direction, upper alignment layer in the −x direction), then depending on location, a liquid crystal molecule may tilt in the +x or −x direction if subject to an electric field having a +x or −x component, respectively. For example, the liquid crystal molecules 116 located near the electric field line 212 will tilt down toward the +x direction, while those near the electric field line 214 will tilt down toward the −x direction. The liquid crystal molecules 116 near the centerline 216 may initially be balanced by these two tendencies and remain unperturbed. Because the surface rubbing angle introduces a pre-orientation, the liquid crystal molecules near the line 216 wall eventually tilt down toward the +x direction, but the amount of tilt in the +x direction may be reduced due perturbation from the tilting of liquid crystal molecules near the line 214 in the −x direction. As a result, the region near the line 216 may become darker than surrounding regions.

When the rubbing direction is parallel to the lengthwise direction of the reflective strips 170, the liquid crystal molecules 116 at the centerline 216 will tilt down, towards the y-axis regardless of the competing forces in the +x and −x directions. The centerline 216 will have a brightness similar to surrounding regions, which results in a higher light efficiency.

A simulation software, Liquid Crystal Display Simulator 2dimMOS®, available from Autronic-MELCHERS GmbH, Germany, was used to determine the orientations of the liquid crystal molecules 116.

Figure 4A:
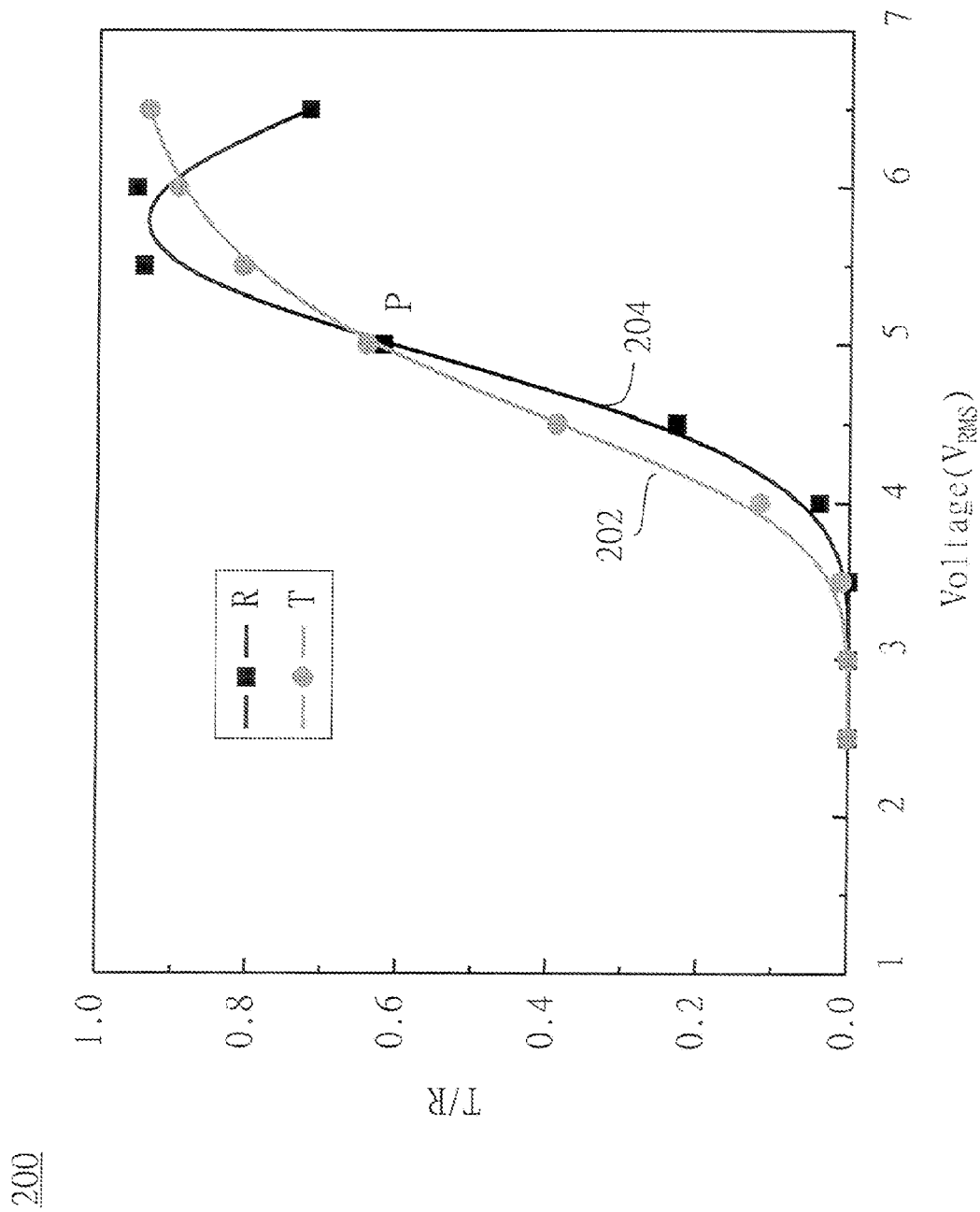
FIGS. 4A to 5C are graphs showing simulated voltage-transmittance (V-T) and/or voltage-reflectance (V-R) curves.

FIG. 4A is a graph 200 showing simulated data for a voltage-transmittance (V-T) curve 202 and a voltage-reflectance (V-R) curve 204. In this example, the reflective strip 170 has a width W=2 μm and the gap G between adjacent strips is 5 μm. Both the transmittance and the reflectance can reach about 90% of the maximum light efficiency when the pixel voltage is about 6.0 $V_{RMS}$. The V-T curve 202 and the V-R curve 204 have a good match with each other, allowing the display 100 to drive the pixels 90 using a single gray scale gamma curve and a single driving circuit. For example, the V-T curve 202 overlaps the V-R curve 204 at at least one point P when the reflectance monotonically increases from the minimum reflectance to the maximum reflectance.

Using the conductive reflective layer 105 to partially shield the electric field in the reflective portion 180 causes the V-T characteristics (represented by the curve 202) to be more similar to the V-R characteristics (represented by the curve 204) for pixel voltages between a first voltage corresponding to a minimum gray scale level (e.g., full dark) and a second voltage corresponding to a maximum gray scale level (e.g., full bright). For example, a level of similarity can be measured by the root-mean-square (RMS) value of the differences between sampled normalized transmittance and reflectance values using the following equation:

$$\text{RMS difference} = \sqrt{\frac{\sum_{i=1}^{N} (T_i - R_i)^2}{N}}. \quad \text{(Equ. 1)}$$

Here, N is the number of sample points, Ti is the transmittance of a given, voltage Vi, and Ri is the reflectance of the given voltage Vi. The lower the RMS difference, the greater the similarity between the V-T curve and the V-R curve. The normalization of the transmittance and reflectance is in reference to the maximum transmission of two stacked parallel linear polarizers. For the V-T curve 202 and the V-R curve 204 in FIG. 4A, by sampling N=256 voltage points between V=2.0 $V_{RMS}$ (corresponding to gray level 0) and V=6.0 $V_{RMS}$ (corresponding to gray level 255), the RMS difference between the V-R and V-T curves is about 8.2%.

Figure 4B:
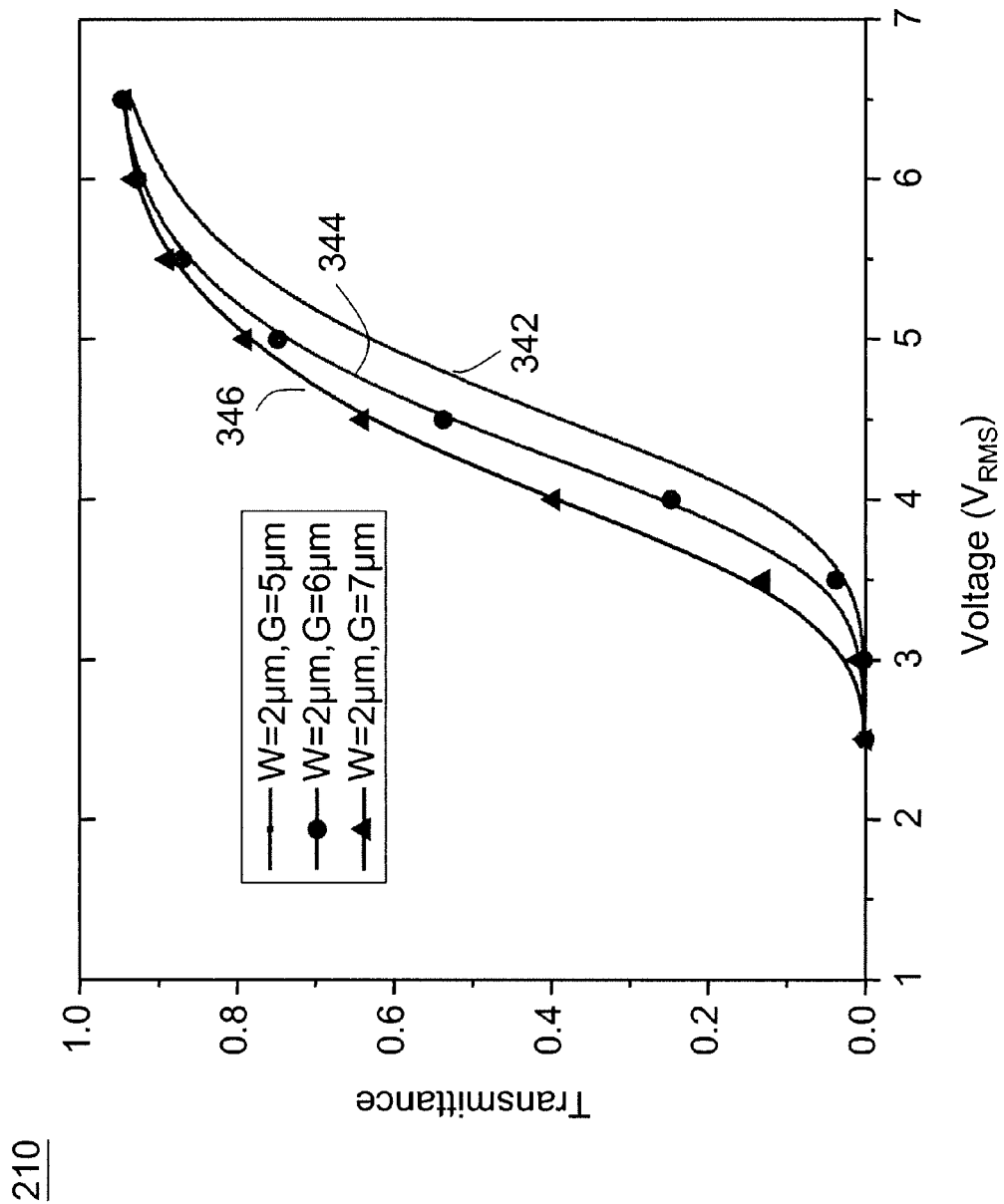

FIG. 4B is a graph 210 showing simulated voltage-transmittance characteristic curves of the pixel 90 in which the width of the reflective strips 170 is W=2 μm. Curves 342, 344, and 346 represent the voltage-transmittance characteristics of the pixel 90 when the gap (G) between adjacent strips 170 is equal to 5 μm, 6 μm, and 7 μm, respectively. The graph 210 indicates that the ratio (W/G) of the reflective strip width W and the gap G can be adjusted without significantly affecting the maximum transmittance.

Figure 4C:
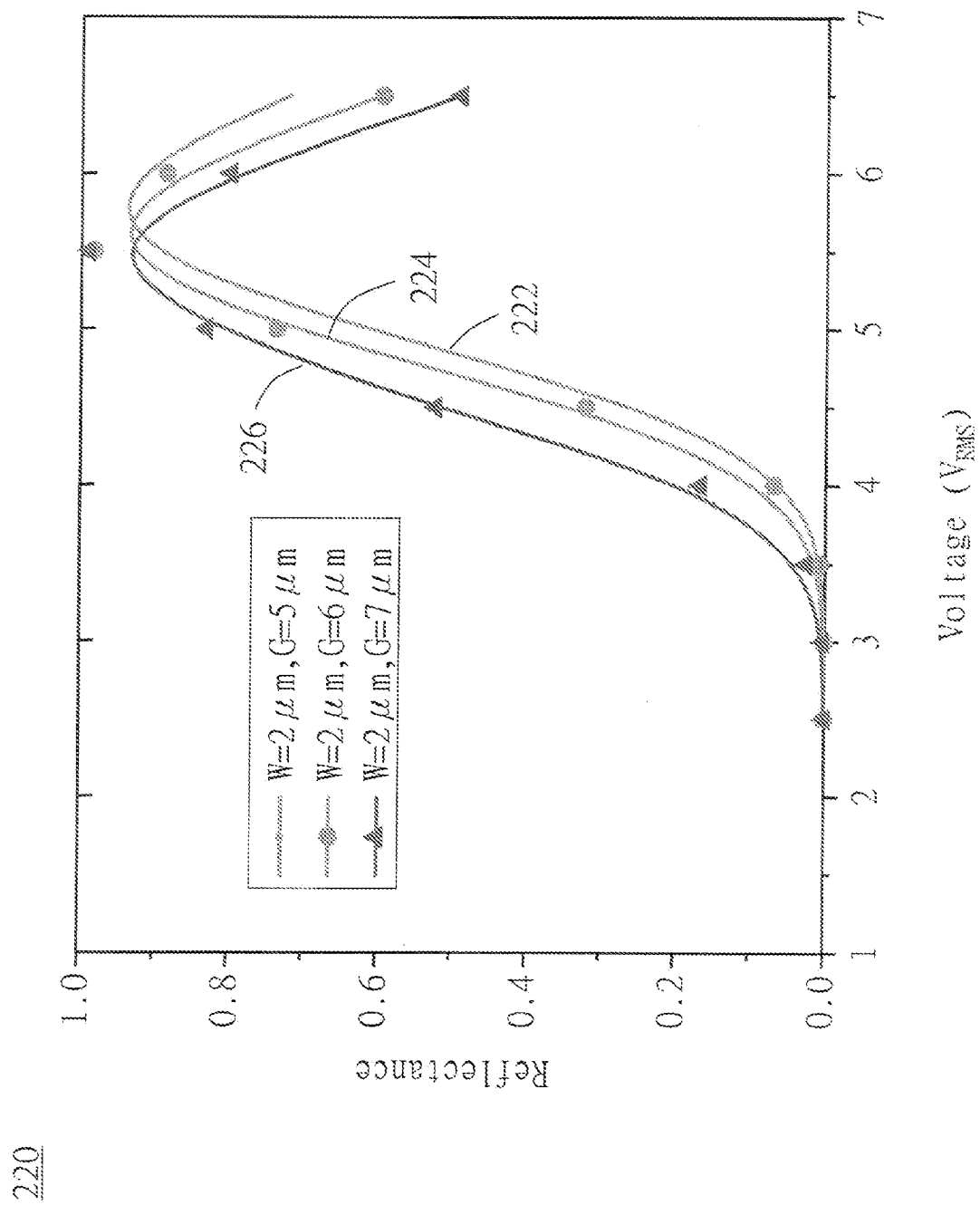

FIG. 4C is a graph 220 showing simulated voltage-reflectance characteristic curves 222, 224, and 226 of the pixel 90 in which the width of the reflective strips 170 is set at W=2 μm, and the gap (G) between adjacent strips 170 is equal to 5 μm, 6 μm, and 7 μm, respectively. The graph 220 indicates that the ratio (W/G) of the reflective strip width W and the gap G can be adjusted without significantly affecting the maximum reflectance, which in this example is close to 90% when the pixel voltage is about 6$V_{RMS}$.

In both FIGS. 4B and 4C, the V-R or V-T curves shift to the left as the gap G increases. FIGS. 4B and 4C show that the ratio (W/G) of reflective strip width W and gap G can be adjusted without significantly affecting the close matching between the voltage-transmittance characteristics and the voltage-reflectance characteristics of the pixel 90.

Figure 4D:
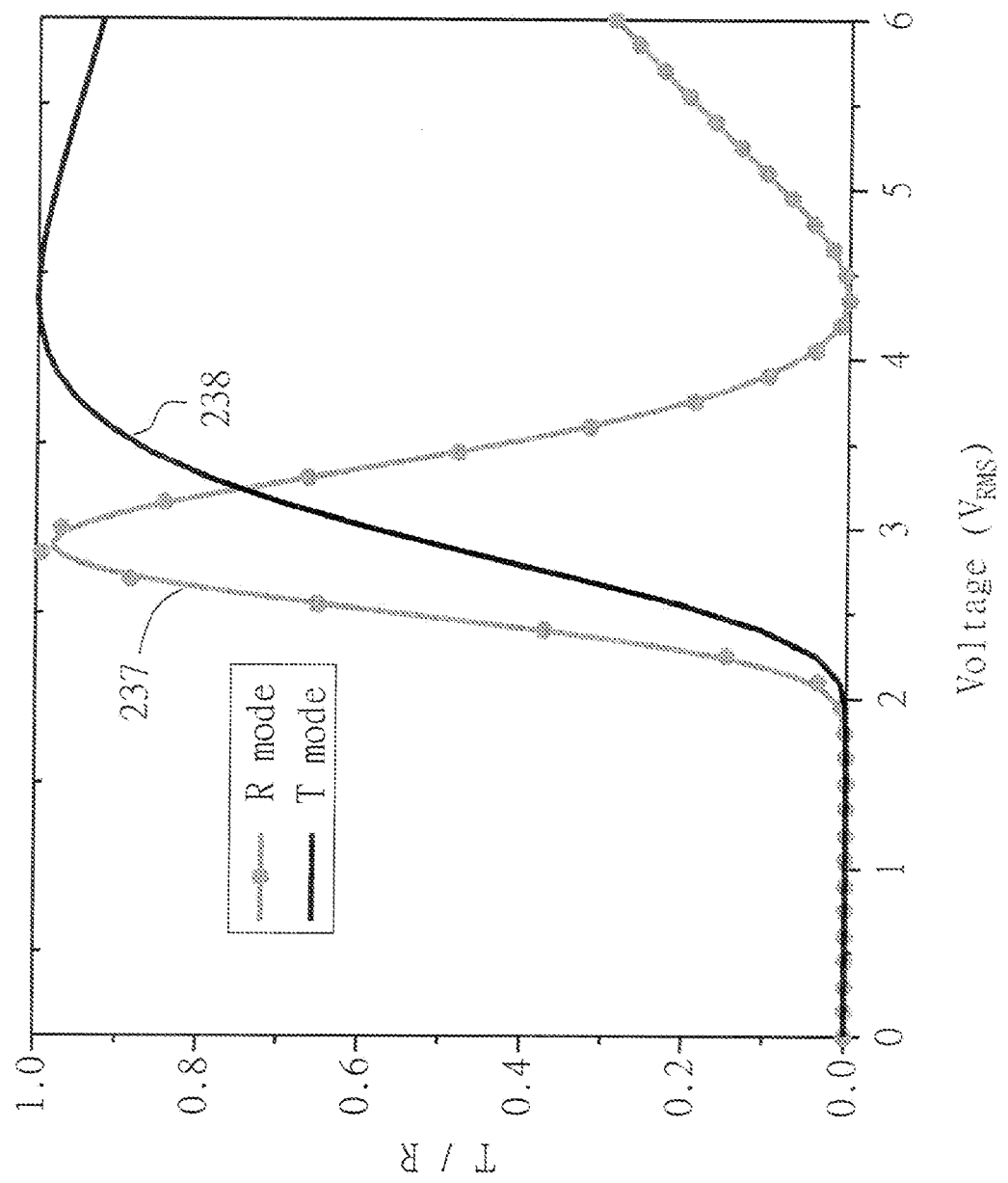

For comparison, FIG. 4D is a graph 236 showing simulated data for a voltage-reflectance curve 237 and a voltage-transmittance curve 238 of a pixel that is similar to the pixel 90 of FIG. 1 but without the conductive reflective layer. Using Equ. 1 and assuming that the pixel voltage V=1.5 $V_{RMS}$ corresponds to gray level 0 and V=3.0 $V_{RMS}$ corresponds to gray level 255, the RMS difference between the V-R curve 237 and V-T curve 238 can be calculated to be about 31%, which is much higher than the RMS difference (which is equal to 8.2%) between the V-T and V-R curves for the pixel 90 that has the conductive reflective layer 105.

Figure 5A:
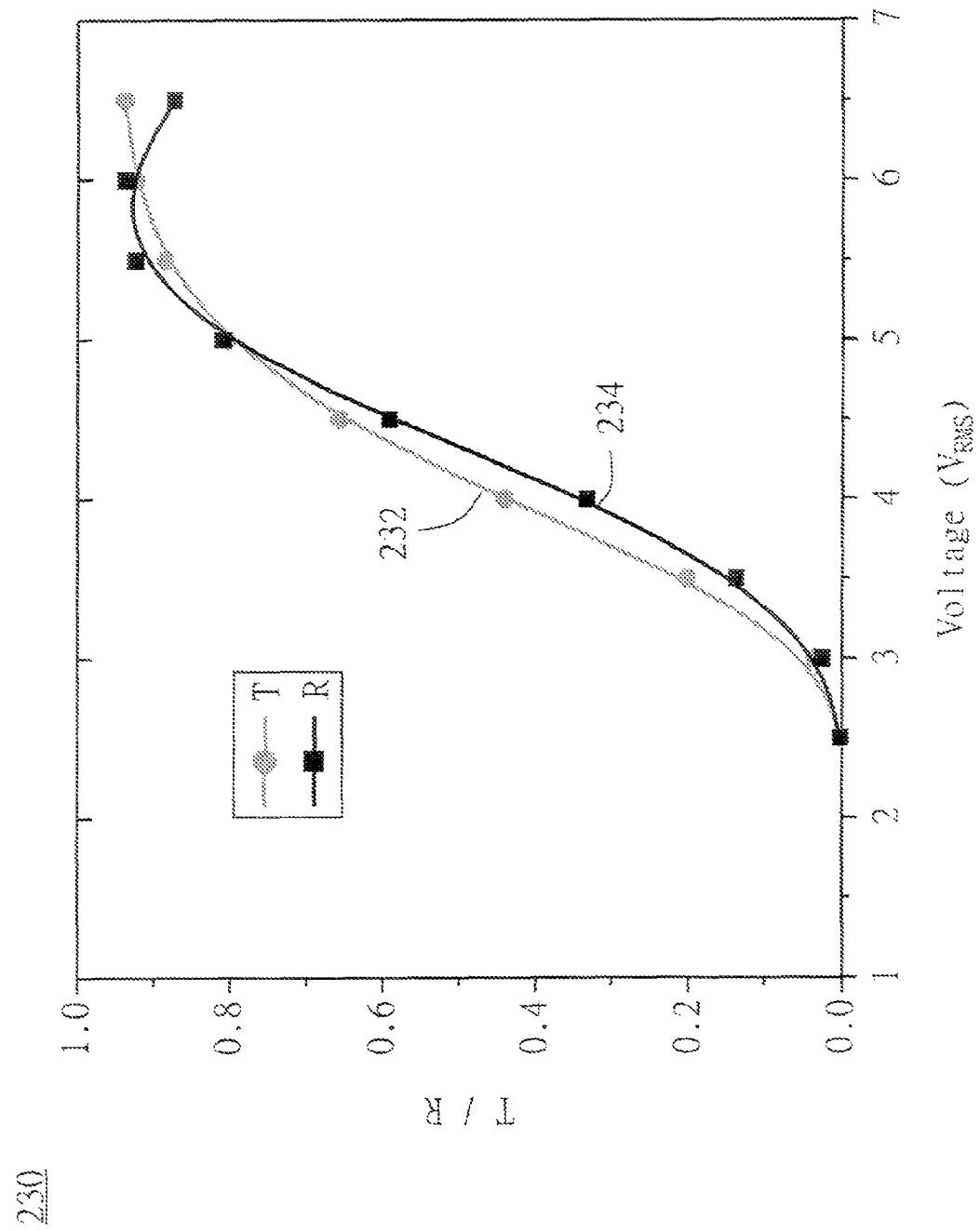

FIG. 5A is a graph 230 showing simulated data for a voltage-transmittance curve 232 and a voltage-reflectance curve 234 of the pixel 90 when the conductive reflective layer 105 is biased at 1.5 $V_{RMS}$. The width of the reflective strips 170 is W=3 μm, and the gap between the reflective strips is G=6 μm.

The threshold voltage of the liquid crystal material is about 2 $V_{RMS}$. When the pixel electrode is set at 0 $V_{RMS}$, the liquid crystal directors are substantially vertically aligned, resulting in a good dark state. Due to the small voltage on the reflective layer 105, the electric field in the reflective region 180 at the voltage-on state becomes stronger as compared to the case where 0 $V_{RMS}$ is applied to the reflective layer 105. The graph 230 indicates that the light efficiency can be improved to about 93% at V=6 $V_{RMS}$, while the voltage-transmittance and voltage-reflectance characteristics curves 232 and 234 still match well with each other.

Using Equ. 1 and assuming that pixel voltage V=2.0 $V_{RMS}$ corresponds to gray level 0 and Y=6.0 $V_{RMS}$ corresponds to gray level 255, the RMS difference between the V-T and V-R curves for the example in FIG. 5A is about 5.2%, which is smaller than RMS=8.2% for the example in FIG. 4A. This indicates biasing the conductive reflective layer at a level slightly lower than the threshold voltage increases a level of similarity between the voltage-transmittance and voltage-reflectance characteristics.

FIG. 5B is a graph 240 showing simulated voltage-transmittance characteristic curves of the pixel 90 in which the reflective layer 105 is set at 1.5 $V_{RMS}$, and the width of the reflective strips 170 is set at W=3 μm. Curves 242, 244, and 246 represent the voltage-transmittance characteristics of the pixel 90 when the gap (G) of adjacent reflective strips is equal to 5 μm, 6 μm, and 7 μm, respectively. The graph 240 indicates that the ratio (W/G) of the reflective strip width W and the gap G can be adjusted without significantly affecting the maximum transmittance, which is greater than 90%.

Figure 5C:
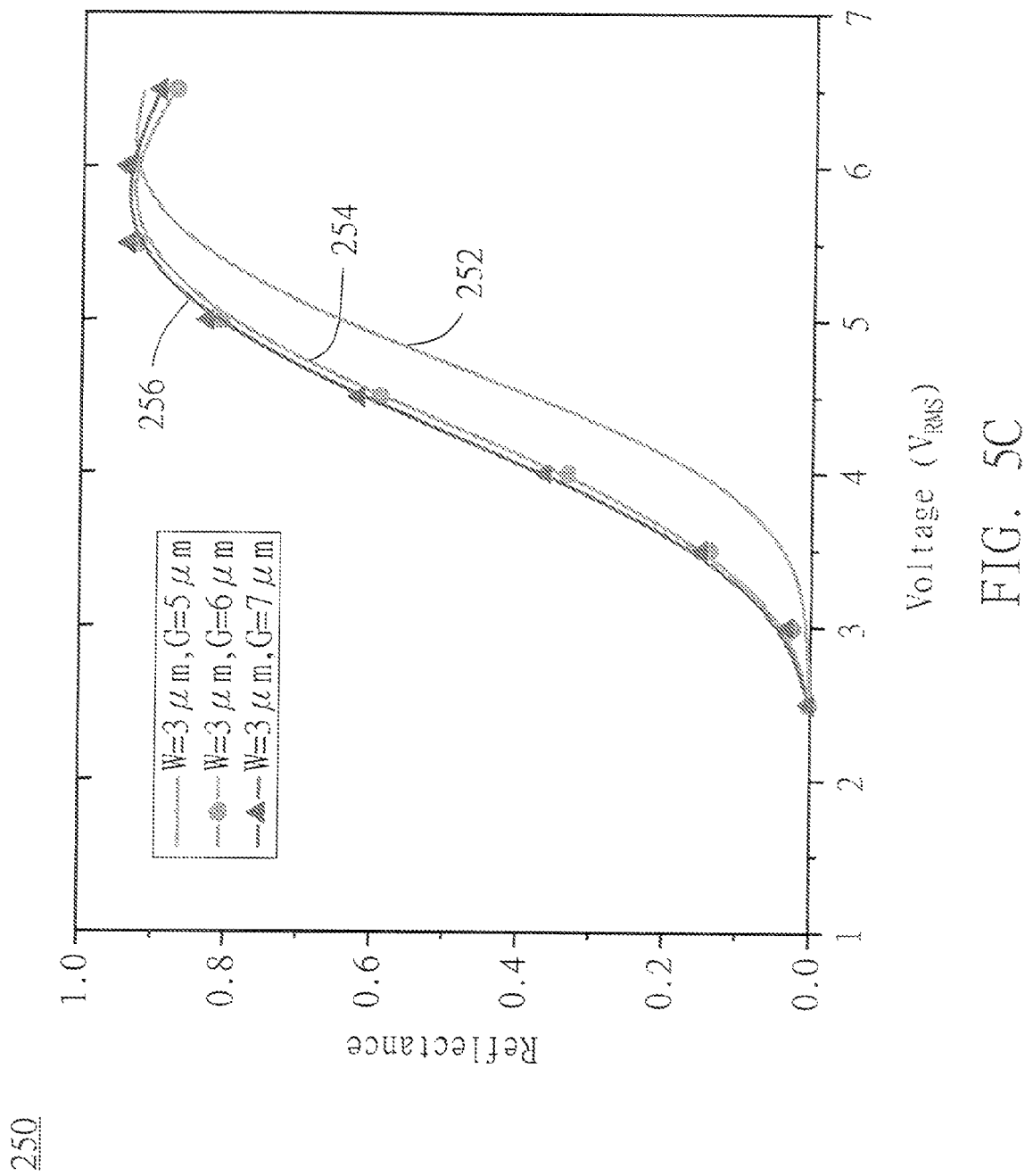

FIG. 5C is a graph 250 showing simulated voltage-reflectance characteristic curves 252, 254, and 256 of the pixel 90 in which the width (W) of the reflective strips 170 is set at 3 μm, and the gap (G) between adjacent strips 170 is equal to 5 μm, 6 μm, and 7 μm, respectively. The graph 250 indicates that the maximum light reflectance is above 90% for all three cases when the pixel voltage is at about 6$V_{RMS}$. The ratio (W/G) of the reflective strip width W and the gap G can be adjusted without significantly affecting the maximum reflectance. FIGS. 5B and 5C show that the ratio (W/G) of the reflective strip width W and the gap G can be adjusted without significantly affecting the close matching between the voltage-transmittance characteristics and the voltage-reflectance characteristics of the pixel 90. When the gap G is greater than 6 μm, the V-T and V-R characteristic curves does not change significantly in response to the change of gap value.

Figure 6A:
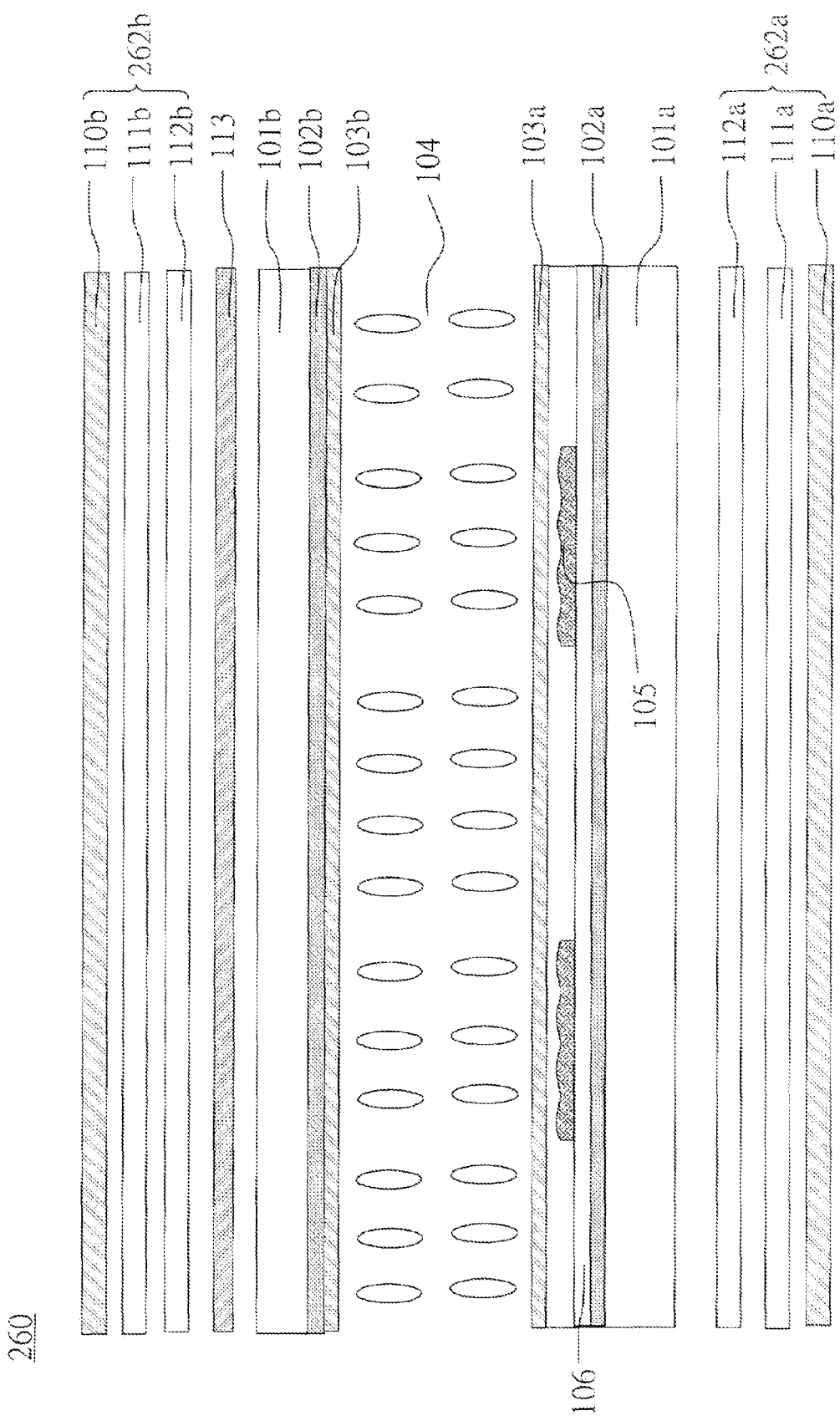
FIG. 6A is a cross-sectional diagram of a display.

FIG. 6A is a cross-sectional diagram of an example of a display 260 that includes compensation films to increase viewing angle. The display 260 includes a liquid crystal layer 104, a lower glass substrate 101a, an upper glass substrate 101b, a lower alignment layer 103a, an upper alignment layer 103b, a transparent pixel electrode 102a, a transparent common electrode 102b, a patterned conductive reflective layer 105, a passivation layer 106, a bottom linear polarizer 110a, and a top linear polarizer 110b, which are similar to those of the display 100 of FIG. 1.

The display 260 additionally includes a first monochromatic half-wave film 111a and a first monochromatic quarter-wave film 112a positioned between the lower polarizer 110a and the lower glass substrate 101a. The two monochromatic films 111a and 112a, together with the bottom linear polarizer 110a, form a first broadband circular polarizer 262a.

A second monochromatic half-wave film 111b and a second monochromatic quarter-wave film 112b are positioned between the upper glass substrate 101b and the upper polarizer 110b. The two monochromatic films 111b and 112b, together with the upper linear polarizer 110b, form a second broadband circular polarizer 262b.

A compensation film layer 113, such as a uniaxial layer, is positioned between the top substrate 101b and the top quarter-wave film 112b to reduce light leakage of the liquid crystal cell at a dark state. The compensation film 113 can be, e.g., a uniaxial negative C film.

In some examples, the monochromatic half-wave film 111a has an extraordinary axis that is set at 15° with respect to the transmission axis of the linear polarizer 110a. The quarter-wave film 112a has an extraordinary axis that is set at 75° with respect to the transmission axis of the linear polarizer 110a. Similarly, the top monochromatic half-wave film 111b and quarter-wave film 112b have their extraordinary axes set along 15° and 75°, respectively, with respect to the transmission axis of the top linear polarizer 110b. See "Achromatic combinations of birefringent plates: part I. An achromatic circular polarizer," by S. Pancharatnam, in Proceedings of Indian Academy of Science, vol. 41, sec. A, 1955, pages 130-136.

Figure 6B:
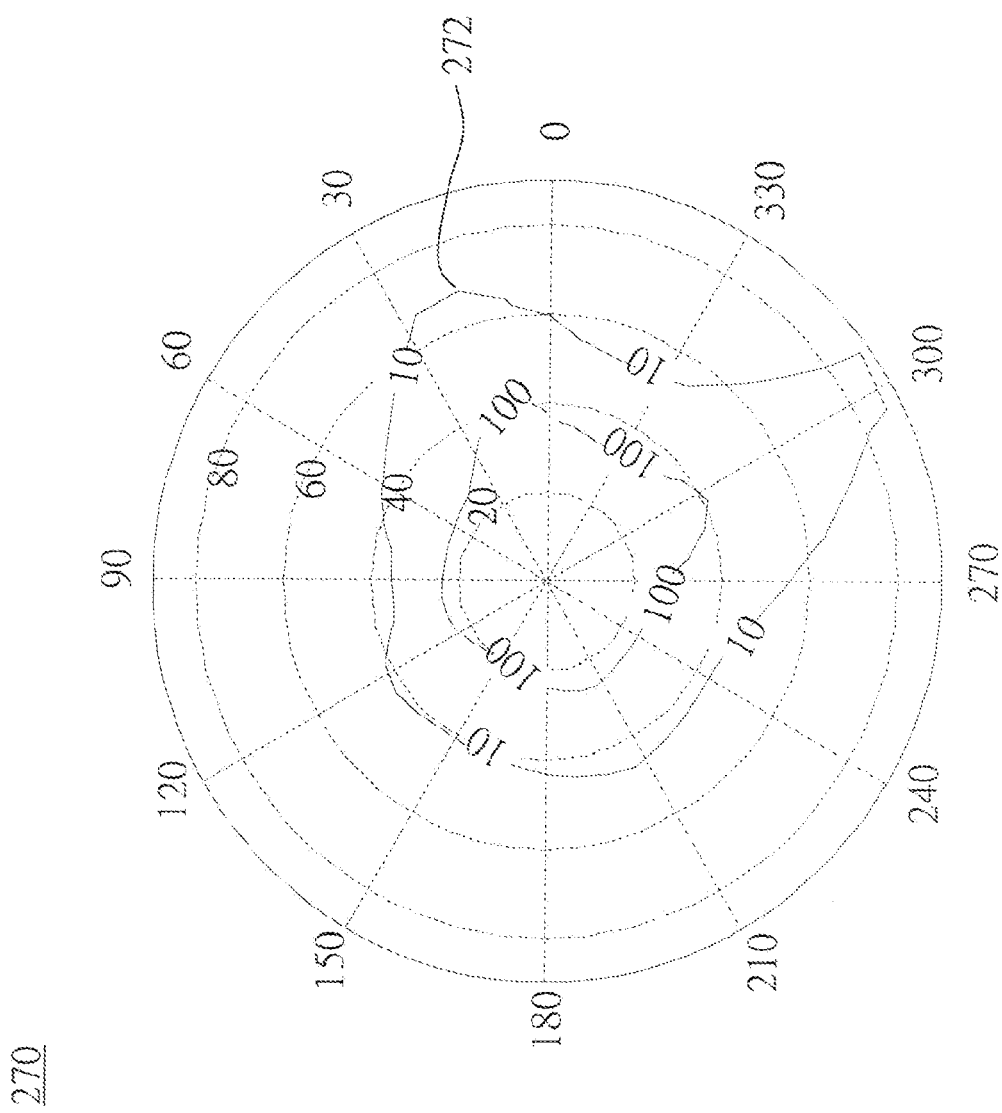
FIGS. 6B and 6C are simulated iso-contrast plots.

FIG. 6B is a simulated iso-contrast plot 270 for the transmissive mode of the display 260 in FIG. 6A. The equal potential lines 272 show that, for azimuthal angles between 60° and 240°, a viewing angle greater than 40° can be achieved for a 10:1 contrast ratio. For azimuthal angles between 0 to 60° and between 240° to 360°, the viewing angle for 10:1 contrast ratio can be higher, e.g., greater than 60° or 80° for some azimuthal angles.

In the simulation for obtaining data for the iso-contrast plot 270, the reflective layer 105 has strips 170 with parameters W=2 μm and G=5 μm. The liquid crystal cell gap is 5 μm, and the negative C film 113 has a retardation value d·Δn (thickness times the optical birefringence) equal to 207 nm to minimize the light leakage at the dark state viewed from off-axis directions. The monochromatic half-wave films (111a, 111b) and the quarter-wave films (112a, 112b) are designed for a single wavelength a λ=550 nm. The half-wave film used a material with Δn=0.0034 at 550 nm, and the quarter-wave film used a material with Δn=0.0015 at 550 nm. The thicknesses for the half-wave film and the quarter-wave film are 80.88 μm and 91.67 μm, respectively.

Figure 6C:
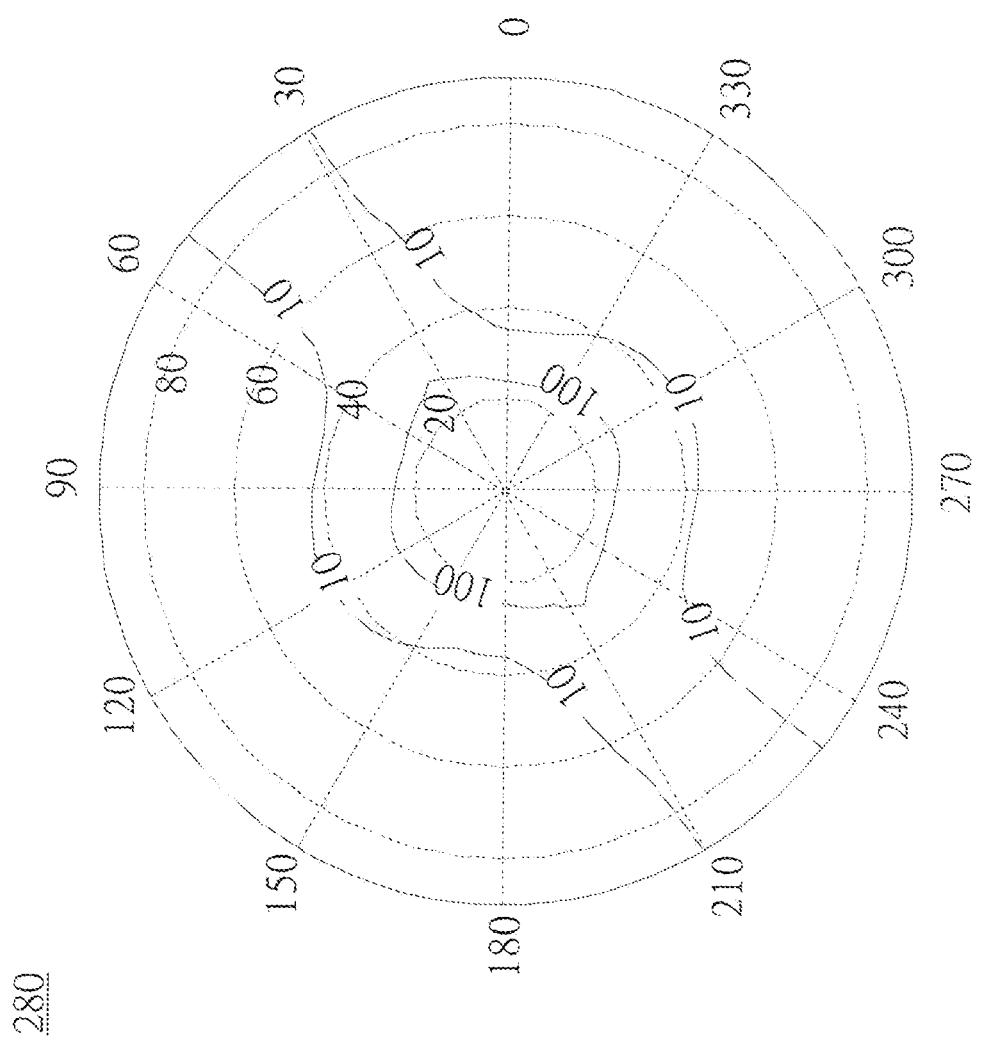

FIG. 6C is a simulated iso-contrast plot 280 for the reflective mode of the display 260, in which 10:1 contrast ratio can be achieved for a viewing angle of 40° at most directions, and a viewing angle greater than 85° for azimuthal angles 30° to 50° and 210° to 230°.

In some examples where the reflective layer 105 includes straight strips 170 such that those shown in FIG. 2, the rubbing directions of the alignment layers 103a and 103b are parallel to the lengthwise direction of the reflective strips 170. The rubbing directions of the alignment layers 103a and 103b can also be set at other angles. For different rubbing directions that are not perpendicular to the lengthwise direction of the reflective strips 170, the pixel 90 can still achieve a high light efficiency and a good match between the transmittance and reflectance characteristics.

Figure 7:
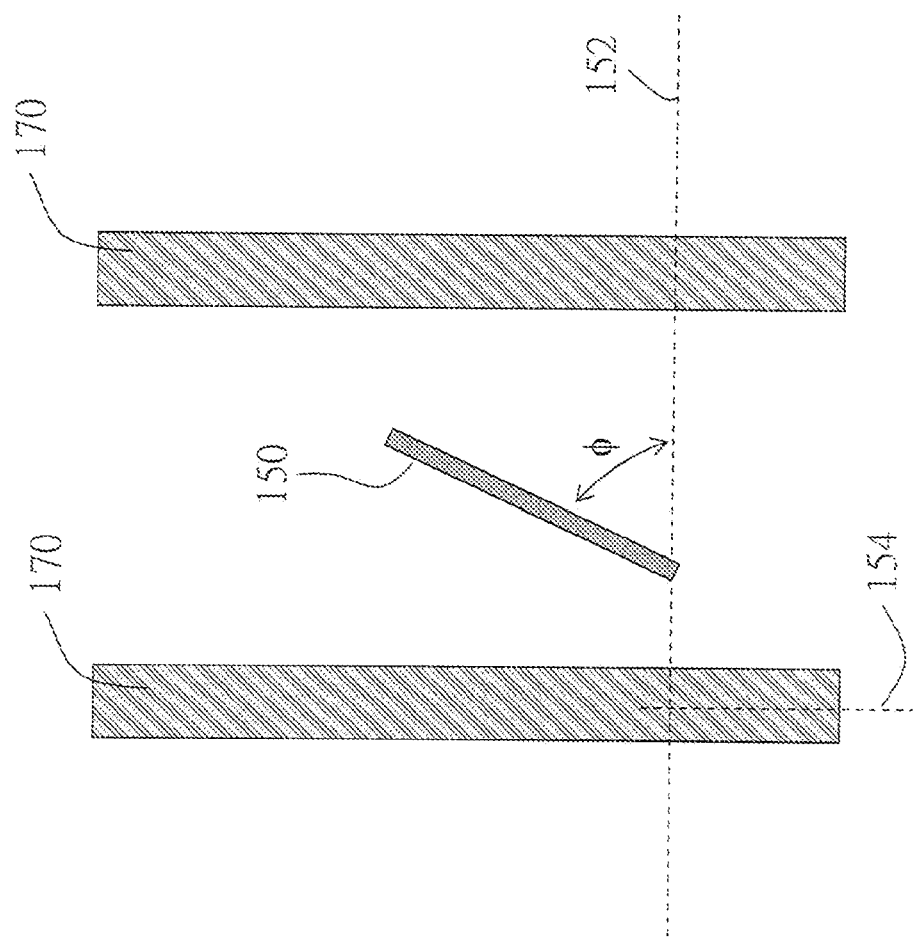
FIG. 7 is a diagram showing a rubbing angle.

Referring to FIG. 7, in a display that uses a conductive reflective layer having straight reflective strips 170, a parameter rubbing angle φ can be defined as the angle between the rubbing direction 150 and the direction 152 perpendicular to the lengthwise direction 154 of the reflective strips 170. Simulation shows that the light efficiency of the pixel and the matching between the V-T and V-R curves are not sensitive to the rubbing angle φ.

Figure 8A:
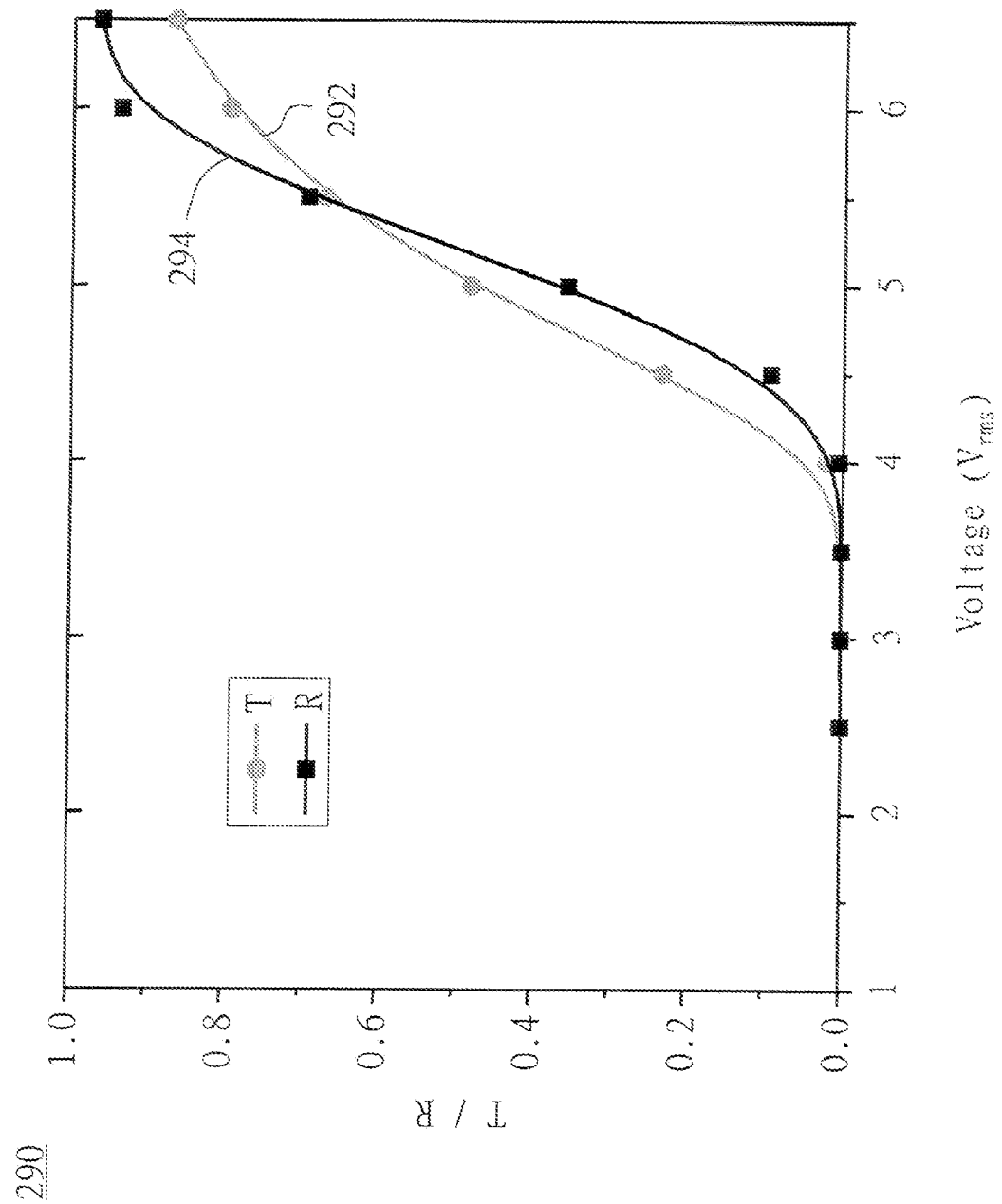
FIGS. 8A to 9B are graphs showing simulated V-T and V-R curves.

FIG. 8A is a graph 290 showing simulated data for a V-T curve 292 and a V-R curve 294 when the rubbing angle is φ=10°, the reflective strips 170 have widths W=2 μm, and the gap between strips 170 is G=5 μm. The reflective strips 170 are biased at 0 $V_{RMS}$.

Figure 8B:
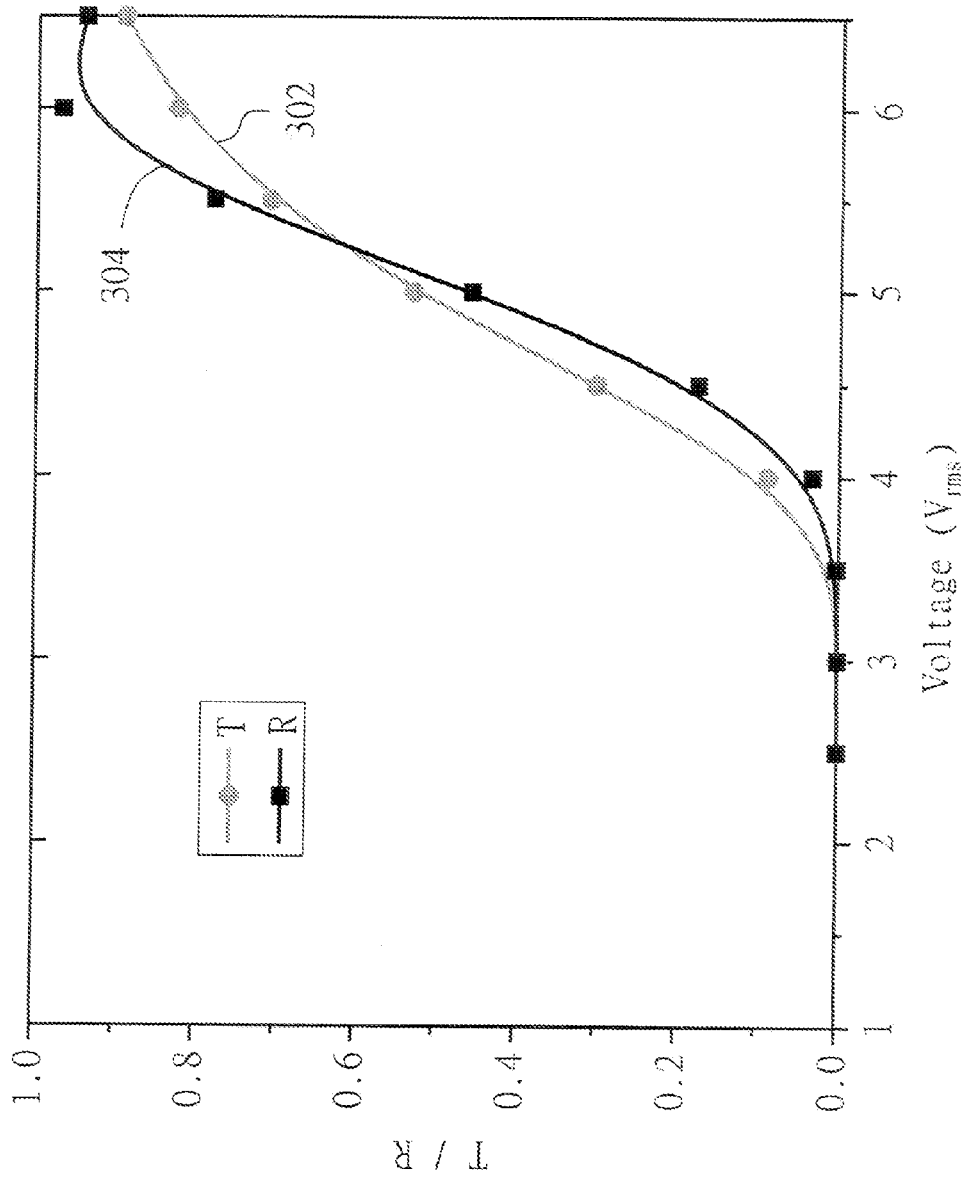

FIG. 8B is a graph 300 showing simulated data for a V-T curve 302 and a V-R curve 304 when the rubbing angle is φ=50°, the reflective strips 170 have widths W=2 μm and the gap between strips 170 is G=5 μm. The reflective strips 170 are biased at 0 $V_{RMS}$.

Figure 9A:
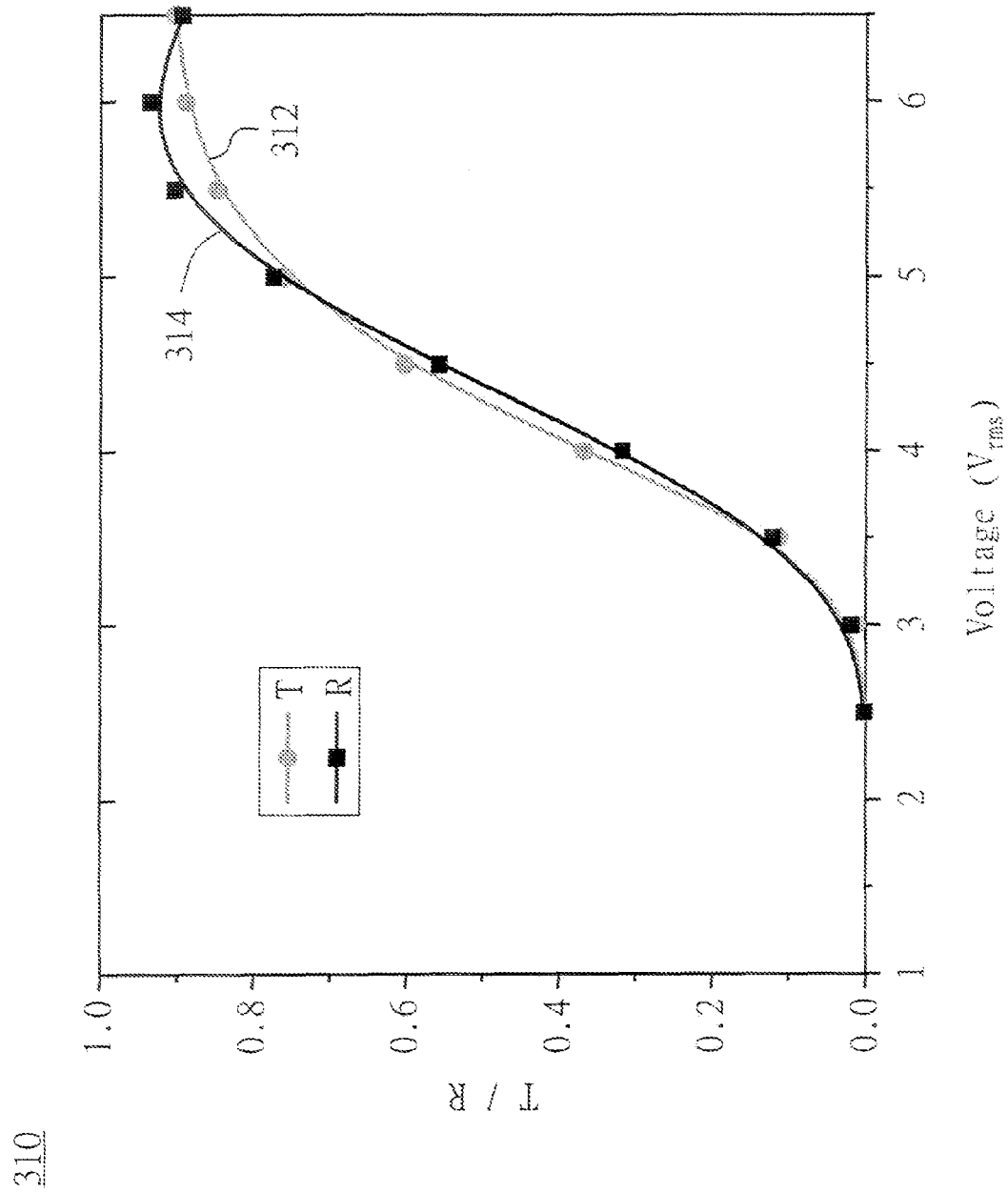

FIG. 9A is a graph 310 showing simulated data for a V-T curve 312 and a V-R curve 314 when the rubbing angle is φ=10°, the reflective strips 170 have widths W=3 μm, and the gap between strips 170 is G=6 μm. The reflective strips 170 are biased at 1.5 $V_{RMS}$.

Figure 9B:
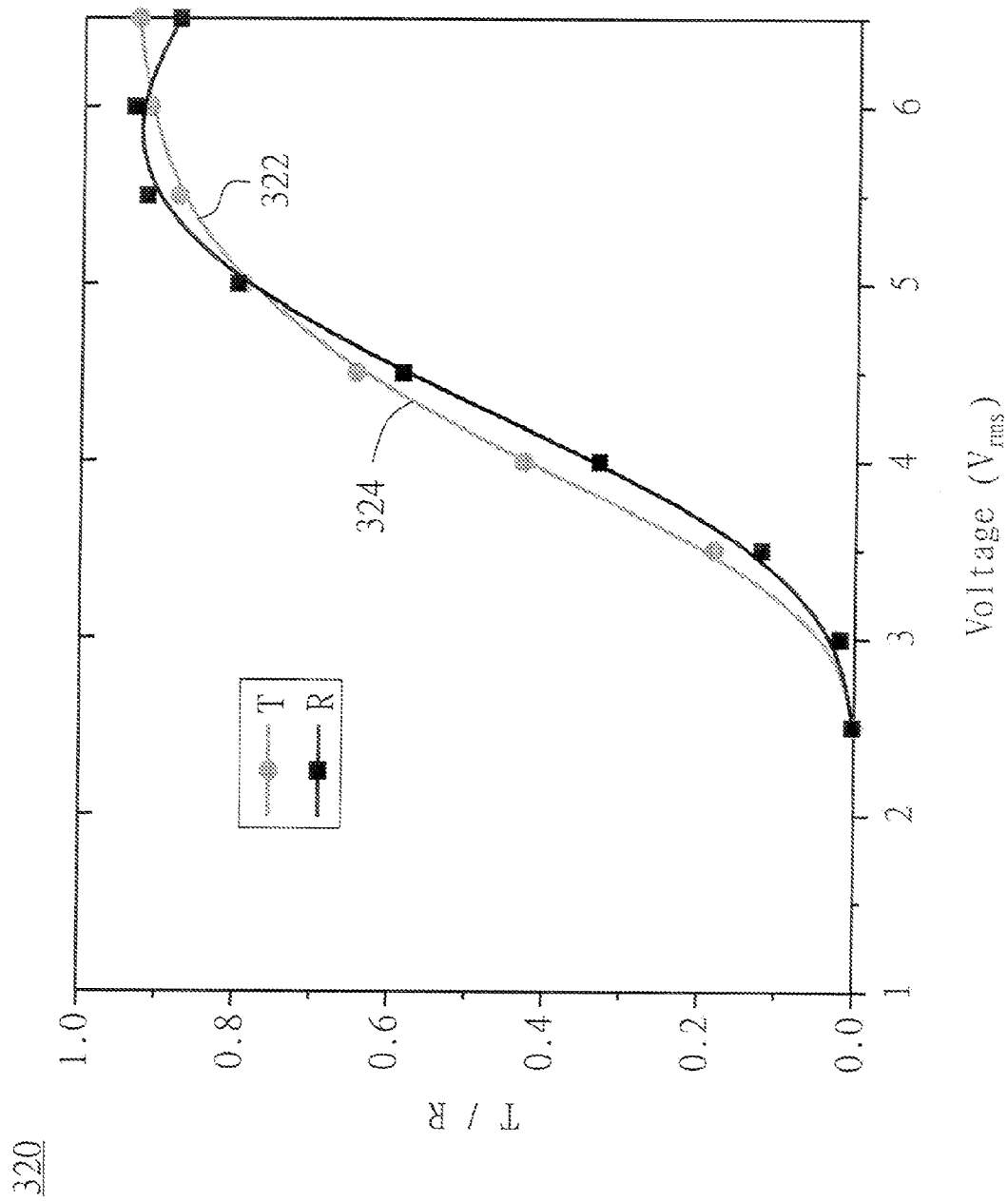

FIG. 9B is a graph 320 showing simulated data for a V-T curve 322 and a V-R curve 324 when the rubbing angle is φ=50°, the reflective strips 170 have widths W=3 μm, and the gap between strips 170 is G=6 μm. The reflective strips 170 are biased at 1.5 $V_{RMS}$.

The graphs 290, 300, 310, and 320 indicate that pixels having different rubbing angles (e.g., 10°, 50°, and 90°) can achieve a high light efficiency (e.g., the reflectance and transmittance can be greater than 85%), and the V-T and V-R curves can have a good match. In general, when straight reflective strips 170 are used, the rubbing angles of the alignment layers 103a and 103b can be from 2° to 178° or from 182° to 358°.

Figure 10:
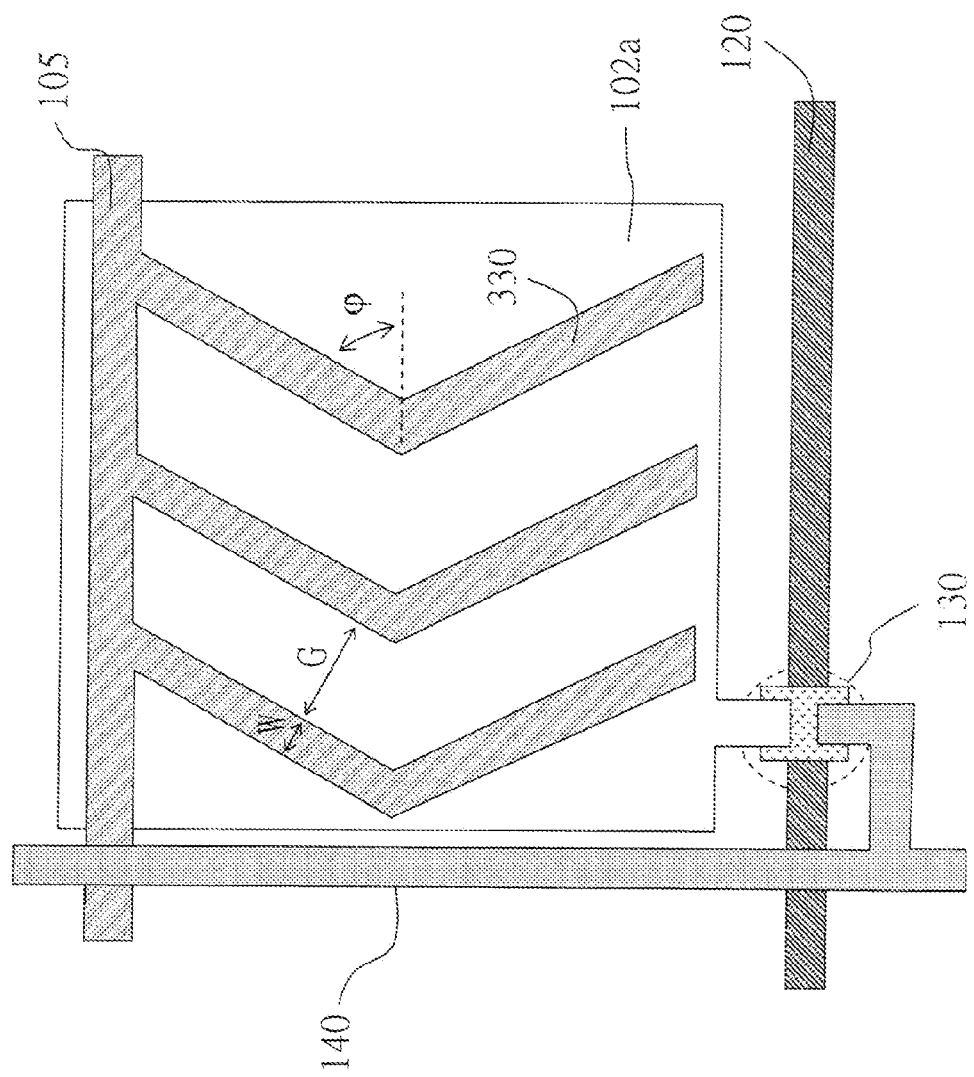

Because the tilt level of the liquid crystal molecules is not sensitive to the rubbing angle φ, the reflective layer 105 can have various shapes. Referring to FIG. 10, the reflective layer 105 can have, e.g., several chevron-like strips 330, or zigzag shaped strips. The chevron-like strips 330 can have a bend angle φ between, e.g., 45° to 90° (the chevron-like strip 330 becomes the straight reflective strip 170 when the bend angle φ is equal to 90°). The shape of the reflective layer 105 can be different from those described above.

Figure 11:
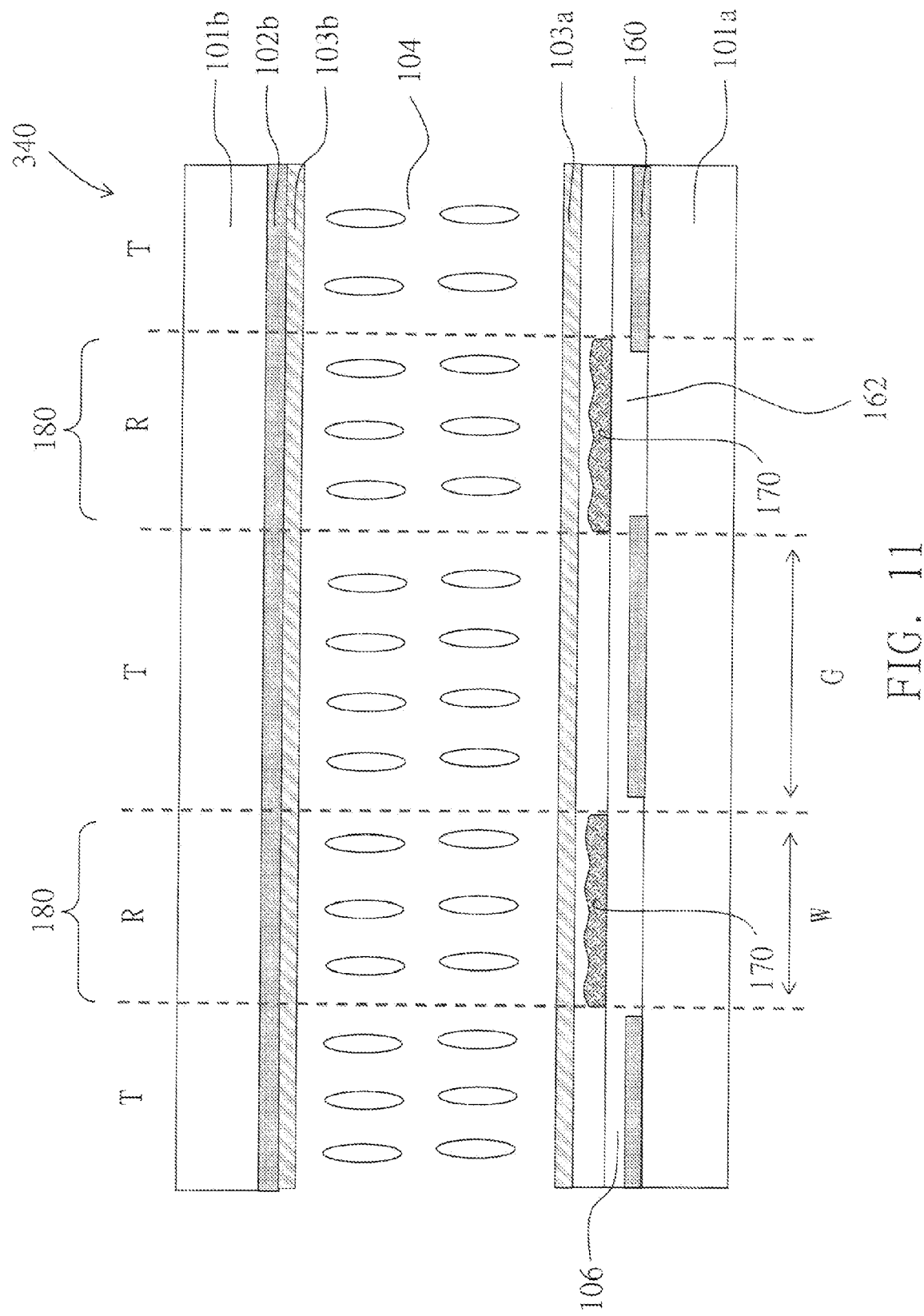
FIG. 11 is a cross-sectional diagram of a pixel.

FIG. 11 is a cross-sectional diagram of an example of a pixel 340 that is similar to the pixel 90 of FIG. 1, except that pixel 340 includes a pixel electrode 160 that extends over only a portion of the pixel area. The pixel electrode 160 has a shape that is complementary to the shape of the conductive reflective layer 105. In this example, when viewed along the cross section of the pixel 340, the pixel electrode 160 has openings 162 below the reflective strips 170 in the reflective portion 180, in which the width of each opening 162 is slightly less or larger than the width of each reflective strip 170. The portion of the pixel electrode 160 covered by the conductive reflective layer 105 does not significantly contribute to the electric field in the liquid crystal layer 104, and thus can be omitted.

Figure 12:
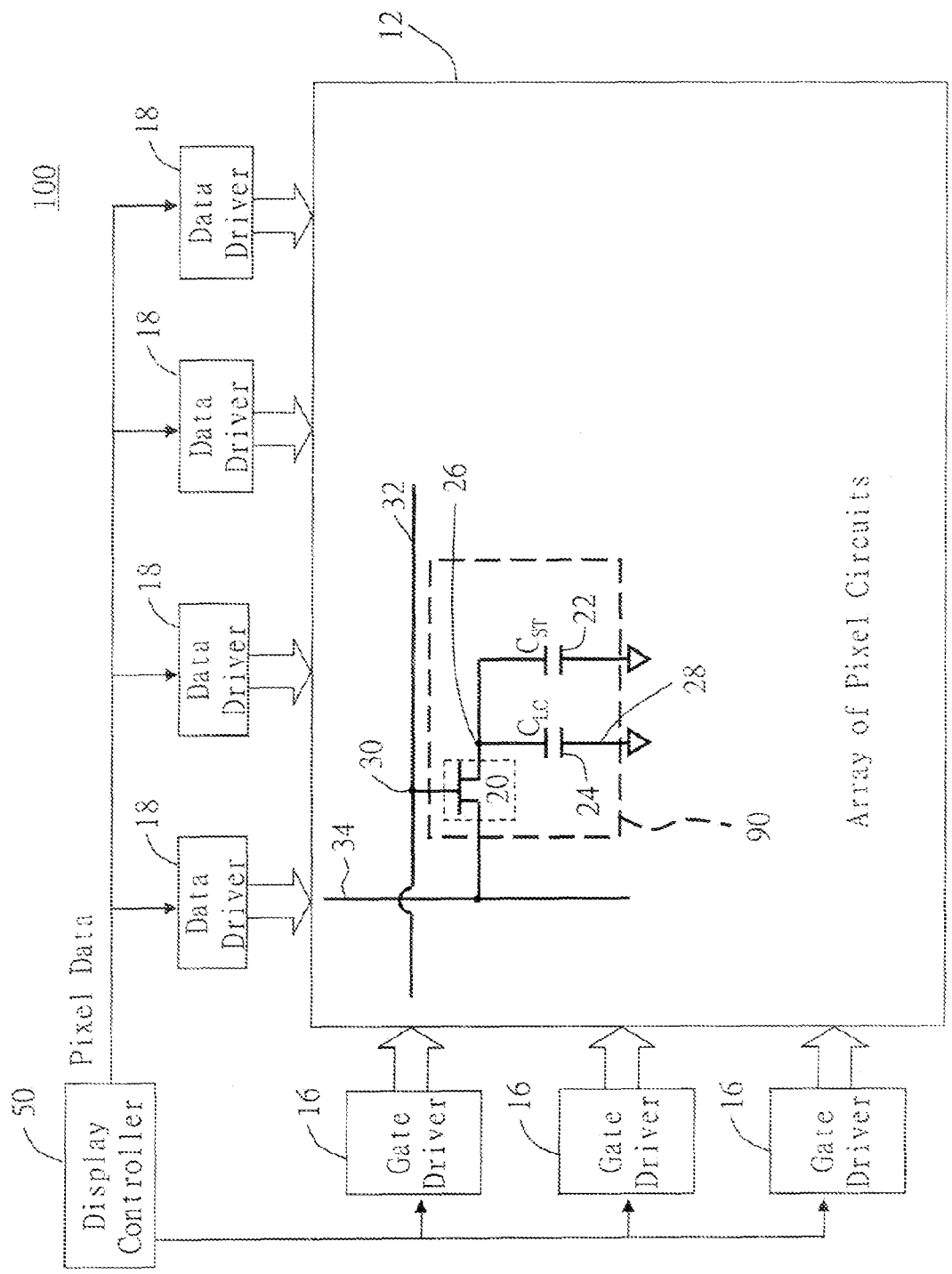
FIG. 12 is a diagram of a liquid crystal display.

FIG. 12 is a diagram of an example of the liquid crystal display 100, which includes an array 12 of pixels 90 that are controlled by one or more gate drivers 16 and one or more data drivers 18. Each pixel 90 includes one or more thin film transistors 20, a storage capacitor $C_{ST}$ 22, and a liquid crystal cell 104, which has an effective capacitance represented by $C_{LC}$ 24. The capacitors $C_{ST}$ 22 and $C_{LC}$ 24 can be, e.g., connected in parallel to the pixel electrode 102a. The capacitor $C_{LC}$ 24 is connected between the pixel electrode 102a and the common electrode 102b. For example, the storage capacitor $C_{ST}$ 22 can be connected between the pixel electrode 102a and a common line connected to a fixed voltage (not shown), or between the pixel electrode 102a and the gate line of another pixel.

The thin film transistor 20 includes a gate 30 that is connected to a gate line 32, which is connected to the gate driver 16. When the gate driver 16 drives the gate line 32 to turn on the thin film transistor 20, the data driver 18 simultaneously drives a data line 34 with a pixel voltage signal (e.g., $V_{DATA}$), which is passed to the storage capacitor $C_{ST}$ 22 and the liquid crystal cell 104. The voltage (e.g., $V_{DATA}$) across the capacitor $C_{ST}$ 22 determines the voltage applied to the liquid crystal cell 104. The voltage on the data line 34 is sometimes referred to as a "gray scale voltage" because it determines the gray scale level shown by the pixel 90.

Other implementations and applications are also within the scope of the following claims. For example, in FIG. 12, the pixels 90 can be replaced by other types of pixels, such as those shown in FIGS. 6A and 11. Additional passivation layers and alignment layers can be used in the displays described above. The components of the displays, such as the liquid crystal layer, and the polarization films, can use materials and have parameters different from those described above. The retardation values d·Δn of the films can be different from those described above. Compensation films different from those described above can be used. In some examples, a negative C film or a positive O film can be used as a compensation film. Other compensation films are described in "Analytical solutions for uniaxial-film-compensated wide-view liquid crystal displays" by X. Zhu et al, Journal of Display Technology, vol. 2, pages 2-20, 2006. When the display is operating in the transmissive mode in which the backlight module is turned on, some ambient light may be reflected by the reflective layer 105, so the display can operate in both the transmissive and reflective modes at the same time.

The orientations of the liquid crystal molecules described above refer to the directions of directors of the liquid crystal molecules. The molecules do not necessarily all point to the same direction all the time. The molecules may tend to point more in one direction (represented by the director) over time than other directions. For example, the phrase "the liquid crystal molecules are substantially aligned along a direction normal to the substrates" means that the average direction of the directors of the liquid crystal molecules is generally aligned along the normal direction, but the individual molecules may point to different directions.

What is claimed is:

1. A transflective display comprising:
   pixels each comprising
      a first electrode,
      a second electrode,
      a liquid crystal layer associated with the first and second electrodes, and
      a conductive reflective layer between the liquid crystal layer and the second electrode to reflect ambient light, the conductive reflective layer being insulated from the second electrode and covering less than all of the second electrode to allow backlight to be transmitted through a portion of the pixel not covered by the conductive reflective layer, the conductive reflective layer being connected to a reference voltage having a root-mean-square value greater than 0.5 V and less than a threshold voltage of the liquid crystal layer.

2. The display of claim 1 in which the conductive reflective layer is to shield a portion of the electric field between the first and second electrodes.

3. The display of claim 1 wherein the conductive reflective layers of at least two of the pixels are electrically connected.

4. The display of claim 1 wherein the conductive reflective layers of at least two of the pixels are electrically connected to a common reference voltage.

5. The display of claim 1 wherein the conductive reflective layer is to reduce an effective birefringence change in a portion of the liquid crystal layer corresponding to the conductive reflective layer when an electric field is applied across the liquid crystal layer.

6. The display of claim 1, further comprising a passivation layer between the conductive reflective layer and the second electrode.

7. The display of claim 1 wherein the first electrode is to be connected to a first reference voltage.

8. The display of claim 7 wherein the conductive reflective layer is to be connected to a second reference voltage that is different from the first reference voltage.

9. The display of claim 1 wherein the reference voltage connected to the conductive reflective layer has a value selected to increase a degree of similarity between a voltage-transmittance characteristic and a voltage-reflectance characteristic of the pixel as compared to other values, the degree of similarity being measured based on a root-mean-square value of differences between sampled normalized transmittance and reflectance values.

10. The display of claim 1 wherein the conductive reflective layer comprises at least one conductive reflective strip.

11. The display of claim 1 wherein the conductive reflective layer in at least one of the pixels comprises two or more conductive reflective strips.

12. The display of claim 10, further comprising a first alignment layer having a first alignment direction and a second alignment layer having a second alignment direction, the first and second alignment directions being non-perpendicular to a lengthwise direction of the conductive reflective strips.

13. The display of claim 10 wherein each of the conductive reflective strips has a width between 1 μm and 10 μm.

14. The display of claim 10 wherein two adjacent reflective strips are parallel to each other, and the distance between the two conductive reflective strips is between 2 μm and 15 μm.

15. The display of claim 10 wherein each of the conductive reflective strips comprises at least one of straight, curved, and piecewise linear shapes.

16. The display of claim 1 wherein the liquid crystal layer has a substantially uniform thickness across the pixel.

17. The display of claim 1 wherein the liquid crystal layer comprises a negative dielectric anisotropic liquid crystal material.

18. The display of claim 1 wherein each pixel comprises a storage capacitor for storing an electric charge corresponding to a pixel voltage, and a transistor coupled to the storage capacitor and the second electrode.

19. The display of claim 1 wherein the conductive reflective layer comprises at least one of aluminum and silver.

20. The display of claim 1, further comprising a polarizer.

21. The display of claim 20 wherein the polarizer comprises a circular polarizer.

* * * * *

UNITED STATES PATENT AND TRADEMARK OFFICE
CERTIFICATE OF CORRECTION

| | | |
|---|---|---|
| PATENT NO. | : 7,751,001 B2 | Page 1 of 1 |
| APPLICATION NO. | : 11/689012 | |
| DATED | : July 6, 2010 | |
| INVENTOR(S) | : Zhibing Ge et al. | |

It is certified that error appears in the above-identified patent and that said Letters Patent is hereby corrected as shown below:

Title page, col. 1, (73) Assignees, line 1, delete "Chimel" and insert -- Chimei --.

Title page, col. 1, (73) Assignees, line 1, delete "Maio-Li" and insert -- Miao-Li --.

Col. 1, line 6, delete "BACKGROUND OF THE INVENTION" and insert the same below "Florida." on Col. 1, line 13 as a heading for the given paragraph.

Signed and Sealed this
Eighth Day of February, 2011

David J. Kappos
*Director of the United States Patent and Trademark Office*